US012777416B2

(12) United States Patent
Shafin et al.

(10) Patent No.: US 12,777,416 B2
(45) Date of Patent: Oct. 27, 2026

(54) APPARATUS AND METHOD FOR TARGET WAKE TIME IN MULTI-LINK OPERATION

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/365,133

(22) Filed: Aug. 3, 2023

(65) Prior Publication Data

US 2024/0080761 A1 Mar. 7, 2024

Related U.S. Application Data

(60) Provisional application No. 63/465,148, filed on May 9, 2023, provisional application No. 63/447,271, filed on Feb. 21, 2023, provisional application No. 63/439,508, filed on Jan. 17, 2023, provisional application No. 63/414,340, filed on Oct. 7, 2022, provisional application No. 63/404,058, filed on Sep. 6, 2022, provisional application No. 63/400,286, filed on Aug. 23, 2022.

(51) Int. Cl.
*H04W 52/02* (2009.01)

(52) U.S. Cl.
CPC ............................... *H04W 52/0216* (2013.01)

(58) Field of Classification Search
CPC ......... H04W 52/0216; H04W 52/0274; H04W 72/30; H04W 76/15; H04W 84/12; Y02D 30/70
See application file for complete search history.

(56) References Cited

U.S. PATENT DOCUMENTS

| | | | |
|---|---|---|---|
| 2017/0311258 | A1 | 10/2017 | Asterjadhi et al. |
| 2022/0070772 | A1 | 3/2022 | Ho et al. |
| 2022/0124855 | A1 | 4/2022 | Hu et al. |

FOREIGN PATENT DOCUMENTS

| | | | | |
|---|---|---|---|---|
| KR | 10-2022-0022873 A | 2/2022 | | |
| WO | 2021/003181 A1 | 1/2021 | | |
| WO | WO-2023200660 A1 * | 10/2023 | ............ | H04W 74/04 |

OTHER PUBLICATIONS

IEEE P802.11be—D3.2 "Part 11: Wireless LAN Medium Access Control (MAC) and Physical Layer (PHY) Specifications-Amendment 8: Enhancements for extremely high throughput (EHT)" May 2023, 1055 pgs.

(Continued)

*Primary Examiner* — Ayanah S George

(57) ABSTRACT

A first broadcast target wake time (TWT) schedule may be established on a first link between an access point (AP) multi-link device (MLD) and a non-AP MLD and the first link may be impending to be unavailable. The AP MLD may announce, by including a Broadcast TWT Link Replacement element in a beacon frame or a probe response frame, that the first broadcast TWT schedule on the first link becomes unavailable and a replacement broadcast TWT schedule is available on the alternative link from the time indicated in the Link Replacement Time subfield of the Broadcast TWT Link Replacement element.

20 Claims, 17 Drawing Sheets

(56) References Cited

OTHER PUBLICATIONS

IEEE Std 802.Nov. 2020 "Part 11: Wireless LAN Medium Access Control (MAC) and Physical Layer (PHY) Specifications" IEEE Standard for Information Technology-Telecommunications and Information Exchange between Systems Local and Metropolitan Area Networks-Specific Requirements. Dec. 3, 2020. 4379 pgs.
Extended European Search Report for EP 23857627.6 by European Patent Office dated Apr. 15, 2025.
International Search Report & Written Opinion for PCT/KR2023/012010 by Korean Intellectual Property Office dated Nov. 20, 2023.
Rubayet Shafin et al., 'Comment Resolution on TWT', IEEE 802.11-22/1051r0, Jul. 12, 2022.

* cited by examiner

APPARATUS AND METHOD FOR TARGET WAKE TIME IN MULTI-LINK OPERATION

CROSS-REFERENCE TO RELATED APPLICATIONS

This application claims the benefit of priority from U.S. Provisional Application No. 63/400,286, entitled "METHOD AND APPARATUS FOR RESTRICTED TWT SCHEDULE MASS TRANSITION," filed Aug. 23, 2022; U.S. Provisional Application No. 63/404,058, entitled "METHOD AND APPARATUS FOR RESTRICTED TWT SCHEDULE MASS TRANSITION," filed Sep. 6, 2022; U.S. Provisional Application No. 63/414,340, entitled "METHOD AND APPARATUS FOR RESTRICTED TWT SCHEDULE MASS TRANSITION," filed Oct. 7, 2022; U.S. Provisional Application No. 63/439,508, entitled "METHOD AND APPARATUS FOR RESTRICTED TWT SCHEDULE MASS TRANSITION," filed Jan. 17, 2023; U.S. Provisional Application No. 63/447,271, entitled "METHOD AND APPARATUS FOR RESTRICTED TWT SCHEDULE MASS TRANSITION," filed Feb. 21, 2023; and U.S. Provisional Application No. 63/465,148, entitled "METHOD AND APPARATUS FOR RESTRICTED TWT SCHEDULE MASS TRANSITION," filed May 9, 2023, all of which are incorporated herein by reference in their entirety.

TECHNICAL FIELD

This disclosure relates generally to a wireless communication system, and more particularly to, for example, but not limited to, target wake time (TWT) operation in the wireless communication system.

BACKGROUND

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. Each of multiple links may enable channel access and frame exchanges between the non-AP MLD and the AP MLD independently, which may reduce latency and increase throughput.

The description set forth in the background section should not be assumed to be prior art merely because it is set forth in the background section. The background section may describe aspects or embodiments of the present disclosure.

SUMMARY

One embodiment of the present disclosure may provide an access point (AP) multi-link device (MLD) associated with a non-AP MLD in a wireless network. The AP MLD comprises at least two affiliated APs and a processor is coupled to the at least two APs. The processor configured to: establish a first broadcast Target Wake Time (TWT) schedule on a first link between a first AP affiliated with the AP MLD and a first station (STA) affiliated with the non-AP MLD; transmit a TWT link replacement information to the non-AP MLD via at least one link between the AP MLD and the non-AP MLD, the TWT link replacement information indicating that the first broadcast TWT schedule on the first link is replaced by a second broadcast TWT schedule on a second link between a second AP affiliated with the AP MLD and a second STA affiliated with the non-AP MLD; receive a link replacement acknowledgement from the non-AP MLD via a link between the AP MLD and the non-AP MLD; and move the first broadcast TWT schedule on the first link to the second broadcast TWT schedule on the second link.

In some embodiments, the processor is configured to move the first broadcast TWT schedule on the first link to the second broadcast TWT schedule on the second link at a time indicated in the TWT link replacement information.

In some embodiments, the first broadcast TWT schedule on the first link becomes unavailable and the second broadcast TWT schedule on the second link becomes available at a time indicated in the TWT link replacement information.

In some embodiments, the TWT link replacement information is included in a beacon frame or a probe response frame.

In some embodiments, the link replacement acknowledgement includes information that is same as the TWT link replacement information transmitted by the AP MLD.

In some embodiments, the TWT link replacement information includes an identifier of the first broadcast TWT schedule and an identifier of the second broadcast TWT schedule.

In some embodiments, the TWT link replacement information includes a minimum amount of time for which the second STA is expected to be awake for a period of TWT wake interval on the second link.

In some embodiments, the TWT link replacement information includes an identifier of the first link and an identifier of the second link.

In some embodiments, the first broadcast TWT schedule is a first restricted TWT (R-TWT) schedule and the second broadcast TWT schedule is a second R-TWT schedule, and one or more R-TWT traffic identifiers (TIDs) for the second R-TWT schedule on the second link are derived using intersection of a first set of TIDs and a second set of TIDs. The first set of TIDs is one or more R-TWT TIDs of the first R-TWT schedule and the second set of TIDs is one or more TIDs that are mapped on the second link using TID-to-link mapping.

In some embodiments, TWT parameters of the second R-TWT schedule that are not included in the TWT link replacement information are same as TWT parameters of the first R-TWT schedule.

One embodiment of present disclosure provides a non-access point (AP) multi-link device (MLD) associated with an AP MLD in a wireless network. The non-AP MLD comprises at least two affiliated stations (STAs) and a processor coupled to the at least two STAs. The processor is configured to: establish a membership of a first broadcast Target Wake Time (TWT) schedule on a first link between a first STA affiliated with the non-AP MLD and a first AP affiliated with the AP MLD; receive a TWT link replacement information from the AP MLD via at least one link between the non-AP MLD and the AP MLD, the TWT link replacement information indicating that the first broadcast TWT schedule on the first link is replaced by a second broadcast TWT schedule on a second link between a second STA affiliated with the non-AP MLD and a second AP affiliated with the AP MLD; and transmit a link replacement acknowledgement to the AP MLD via a link between the non-AP MLD and the AP MLD in response to receiving the TWT link replacement information.

In some embodiments, the first broadcast TWT schedule on the first link is moved to the second broadcast TWT schedule on the second link at a time indicated in the TWT link replacement information.

In some embodiments, the first broadcast TWT schedule on the first link becomes unavailable and the second broadcast TWT schedule on the second link becomes available at a time indicated in the TWT link replacement information.

In some embodiments, the TWT link replacement information is included in a beacon frame or a probe response frame.

In some embodiments, the link replacement acknowledgement includes information that is same as the TWT link replacement information received from the AP MLD.

In some embodiments, the TWT link replacement information includes an identifier of the first broadcast TWT schedule and an identifier of the second broadcast TWT schedule.

In some embodiments, the TWT link replacement information includes a minimum amount of time for which the second STA is expected to be awake for a period of TWT wake interval on the second link.

In some embodiments, the TWT link replacement information includes an identifier of the first link and an identifier of the second link.

In some embodiments, the first broadcast TWT schedule is a first restricted TWT (R-TWT) schedule and the second broadcast TWT schedule is a second R-TWT schedule, and one or more R-TWT traffic identifiers (TIDs) for the second R-TWT schedule on the second link are derived using intersection of a first set of TIDs and a second set of TIDs. The first set of TIDs is one or more R-TWT TIDs of the first R-TWT schedule and the second set of TIDs is one or more TIDs that are mapped on the second link using TID-to-link mapping.

In some embodiments, TWT parameters of the second R-TWT schedule that are not included in the TWT link replacement information are same as TWT parameters of the first R-TWT schedule.

Figure 1:
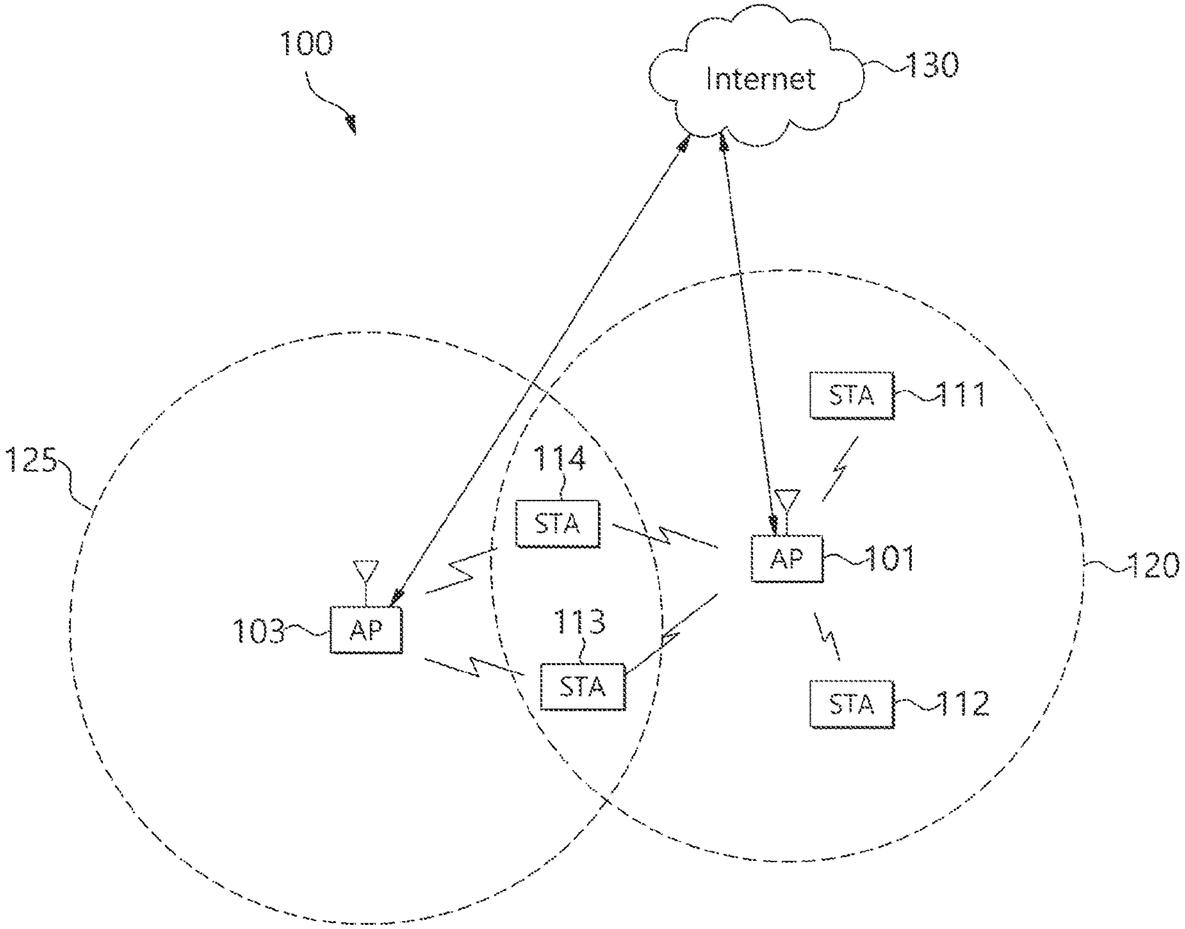
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 communicate with at least one network 130, such as the Internet, a proprietary Internet Protocol (IP) network, or other data network. The AP 101 provides wireless access to the network 130 for a plurality of stations (STAs) 111-114 with a coverage are 120 of the AP 101. The APs 101 and 103 may communicate with each other and with the STAs using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provides STAs with direct wireless broadband access to the network 130. Further, the APs 101 and/or 103 could provide access to other or additional external networks, such as external telephone networks or other types of data networks.

Figure 2A:
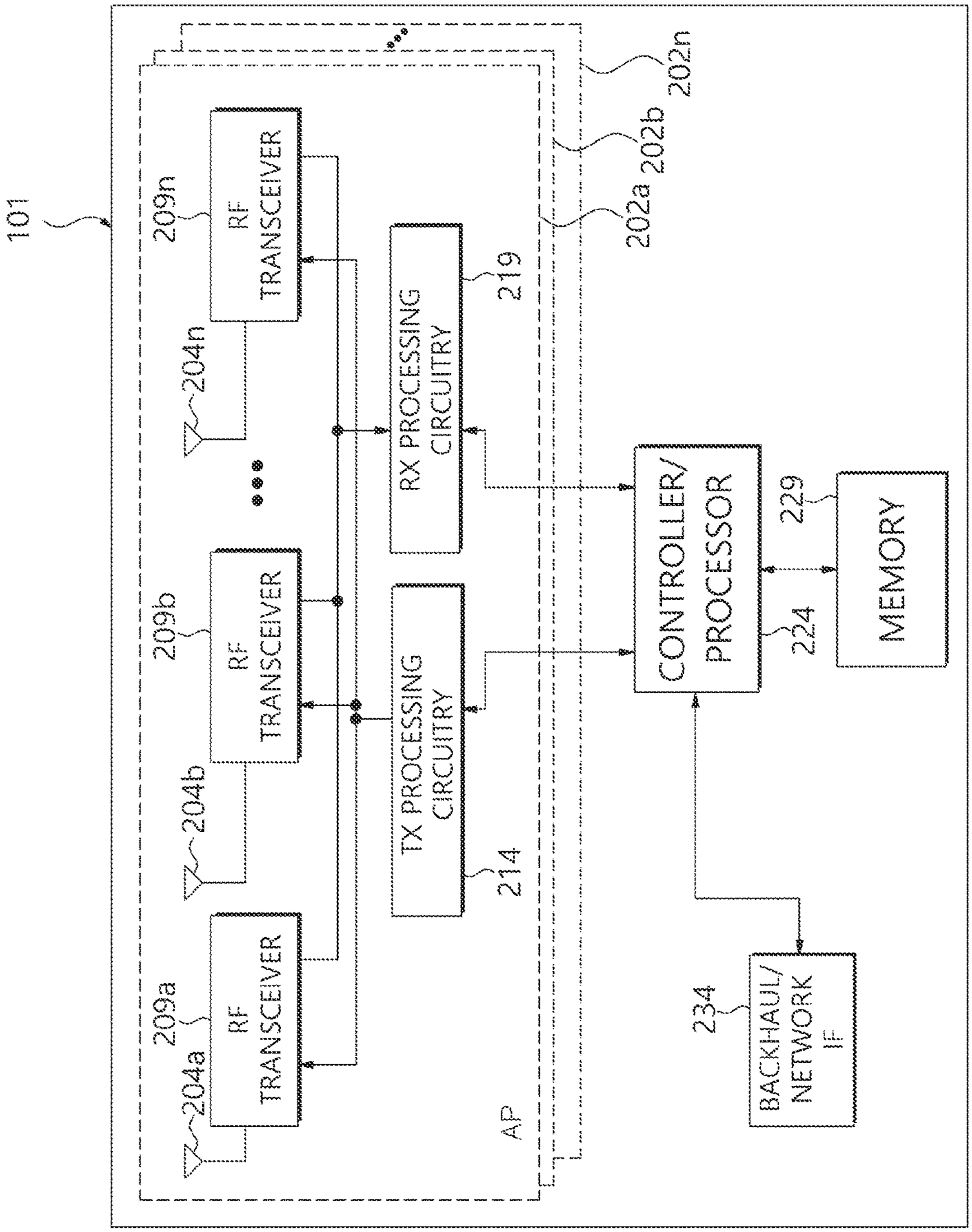
FIG. 2A shows an example of an AP in accordance with an embodiment.

FIG. 2A shows an example of AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204*a*-204*n*, multiple radio frequency (RF) transceivers 209*a*-209*n*, transmit (TX) processing circuitry 214, and receive (RX) processing circuitry 219. The AP 101 also may include a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of uplink signals and the transmission of downlink signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 could include any number of each component shown in FIG. 2A. As a particular example, an AP could include a number of interfaces 234, and the controller/processor 224 could support routing functions to route data between different network addresses. As another example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

As shown in FIG. 2A, in some embodiment, the AP 101 may be an AP MLD that includes multiple APs 202*a*-202*n*. Each AP 202*a*-202*n* is affiliated with the AP MLD 101 and includes multiple antennas 204*a*-204*n*, multiple radio frequency (RF) transceivers 209*a*-209*n*, transmit (TX) processing circuitry 214, and receive (RX) processing circuitry 219. Each APs 202*a*-202*n* may independently communicate with the controller/processor 224 and other components of the AP MLD 101. FIG. 2A shows that each AP 202*a*-202*n* has separate multiple antennas, but each AP 202*a*-202*n* can share multiple antennas 204*a*-204*n* without needing separate multiple antennas. Each AP 202*a*-202*n* may represent a physical (PHY) layer and a lower media access control (MAC) layer.

Figure 2B:
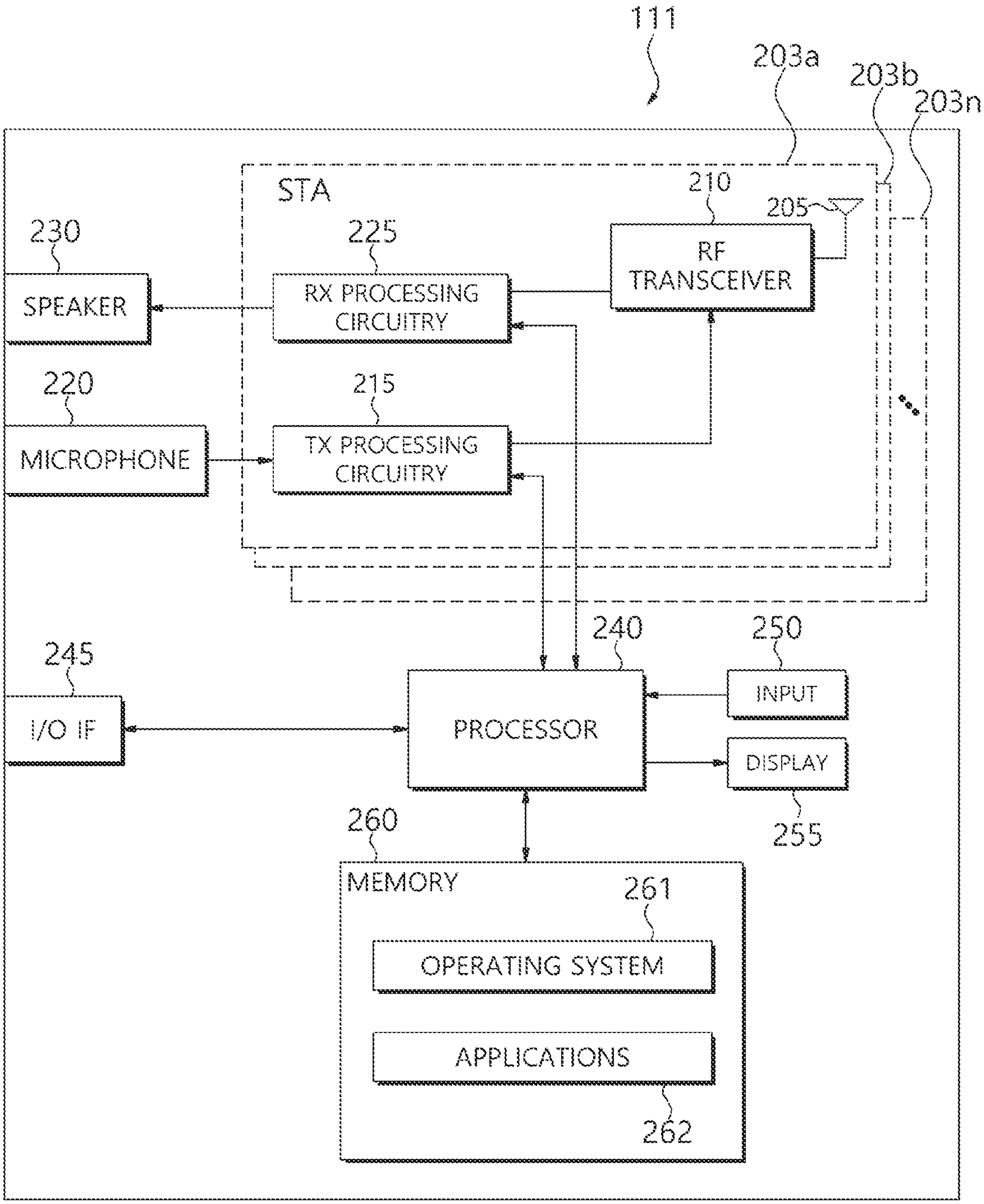
FIG. 2B shows an example of a STA in accordance with an embodiment.

FIG. 2B shows an example of STA 111 in accordance with an embodiment. The embodiment of the STA 111 shown in FIG. 2B is for illustrative purposes, and the STAs 111-114 of FIG. 1 could have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 also may include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an IF or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of downlink signals and the transmission of uplink signals by the RF transceiver 210, the RX processing circuitry 225, and the TX processing circuitry 215 in accordance with well-known principles. The controller/processor 240 can also include processing circuitry configured to provide management of channel sounding procedures in WLANs. In some embodiments, the controller/processor 240 may include at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the main controller/processor 240.

The controller/processor 240 is also coupled to the input 250 (such as touchscreen) and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B shows one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* is affiliated with the non-AP MLD 111 and includes an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 2B shows that each STA 203*a*-203*n* has a separate antenna, but each STA 203*a*-203*n* can share the antenna 205 without needing separate antennas. Each STA 203*a*-203*n* may represent a physical (PHY) layer and a lower media access control (MAC) layer.

Figure 3:
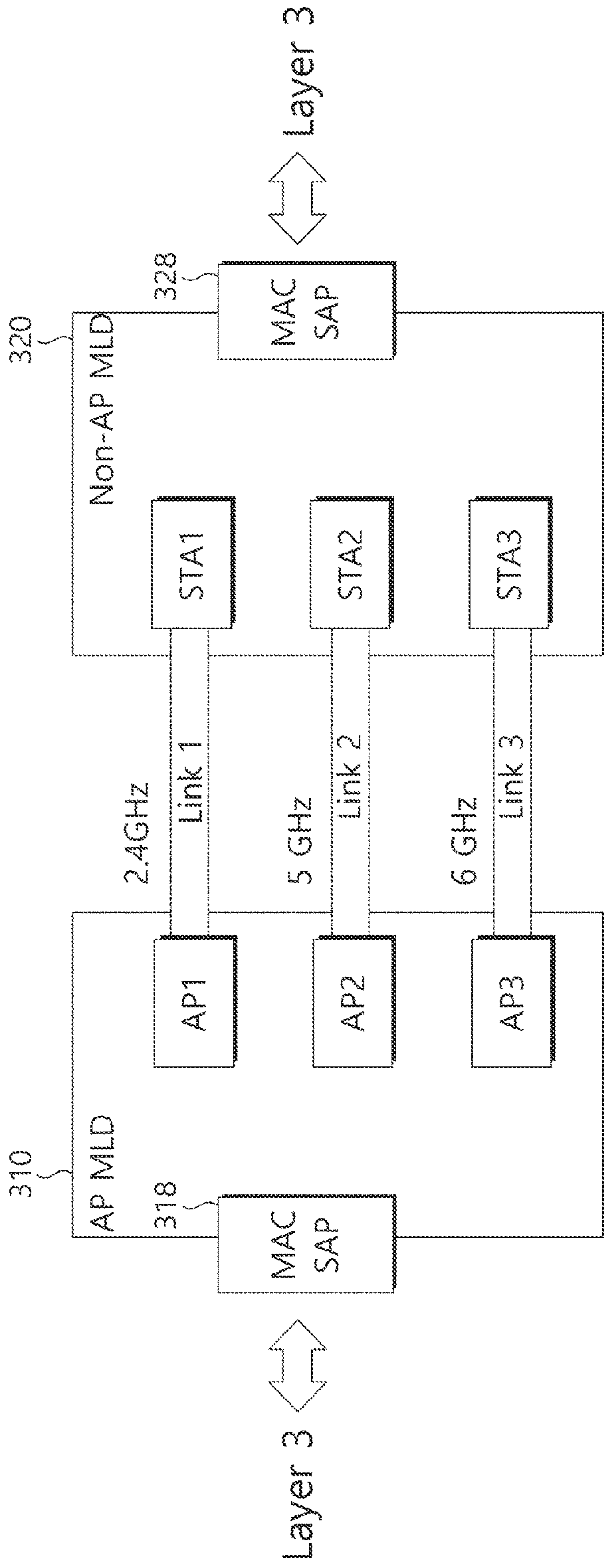
FIG. 3 shows an example of multi-link operation in accordance with an embodiment.

FIG. 3 shows an example of multi-link communication operation in accordance with an embodiment. The multi-link communication operation may be usable in IEEE 802.11be standard and any future amendments to IEEE 802.11 standard. In FIG. 3, an AP MLD 310 may be the wireless communication device 101 and 103 in FIG. 1 and a non-AP MLD 220 may be one of the wireless communication devices 111-114 in FIG. 1.

As shown in FIG. 3, the AP MLD 310 may include a plurality of affiliated APs, for example, including AP 1, AP 2 and AP 3. Each affiliated AP may include a PHY interface to wireless medium (Link 1, Link 2, or Link 3). The AP MLD 310 may include a single MAC service access point (SAP) 318 through which the affiliated APs of the AP MLD 310 communicate with a higher layer (Layer 3 or network layer). Each affiliated AP of the AP MLD 310 may have a MAC address (lower MAC address) different from any other affiliated APs of the AP MLD 310. The AP MLD 310 may have a MLD MAC address (upper MAC address) and the affiliated APs share the single MAC SAP 318 to Layer 3. Thus, the affiliated APs share a single IP address, and the Layer 3 recognizes the AP MLD 310 by assigning the single IP address.

The non-AP MLD 320 may include a plurality of affiliated STAs, for example, including STA 1, STA 2 and STA 3. Each affiliated STA may include a PHY interface to the wireless medium (Link 1, Link 2, or Link 3). The non-AP MLD 320 may include a single MAC SAP 328 through which the affiliated STAs of the non-AP MLD 320 communicate with a higher layer (Layer 3 or network layer). Each affiliated STA of the non-AP MLD 320 may have a MAC address (lower MAC address) different from any other affiliated STAs of the non-AP MLD 320. The non-AP MLD 320 may have a MLD MAC address (upper MAC address) and the affiliated STAs share the single MAC SAP 328 to Layer 3. Thus, the affiliated STAs share a single IP address, and the Layer 3 recognizes the non-AP MLD 320 by assigning the single IP address.

The AP MLD 310 and the non-AP MLD 320 may set up multiple links between their affiliate APs and STAs. In this example, the AP 1 and the STA 1 may set up Link 1 which operates in 2.4 GHz band. Similarly, the AP 2 and the STA 2 may set up Link 2 which operates in 5 GHz band, and the AP 3 and the STA 3 may set up Link 3 which operates in 6 GHz band. Each link may enable channel access and frame exchange between the AP MLD 310 and the non-AP MLD 320 independently, which may increase date throughput and reduce latency.

In order to prioritize transmission of different types of traffic, which are identified by a traffic identifier (TID), across the setup links, the non-AP MLD 320 may negotiate a TID-to-link mapping with the AP MLD 310. The TID-to-link mapping allows the AP MLD 310 and the non-AP MLD 320 to determine how frames belonging to TIDs are assigned for transmission on each setup link in the uplink and downlink directions, respectively. When at least one TID associated with a non-AP MLD 320 is mapped to a setup link in either uplink or downlink direction, the link is referred to as an enabled link for the non-AP MLD 320. By default, all TIDs are mapped to all the setup links between the AP MLD 310 and the non-AP MLD 320, and this mapping is referred to as a default TID-to-link mapping. During association, the non-AP MLD 320 may use a negotiation procedure to negotiate a non-default mapping of TIDs to the setup links, by including a TID-to-Link Mapping element in an association request frame or a reassociation request frame. The non-default mapping may be either where all TIDs are mapped to the same subset of setup links, or where not all TIDs are mapped to the same subset of setup links. The AP MLD 310 may also use a broadcast procedure to indicate switching to a non-default mapping for all associated non-AP MLDs. In default mapping mode, all TIDs are mapped to all setup links for downlink and uplink and all setup links are enabled. The non-AP MLD 320 operates under default mapping mode when a TID-to-link mapping negotiation did not occur or was unsuccessful.

Figure 4:
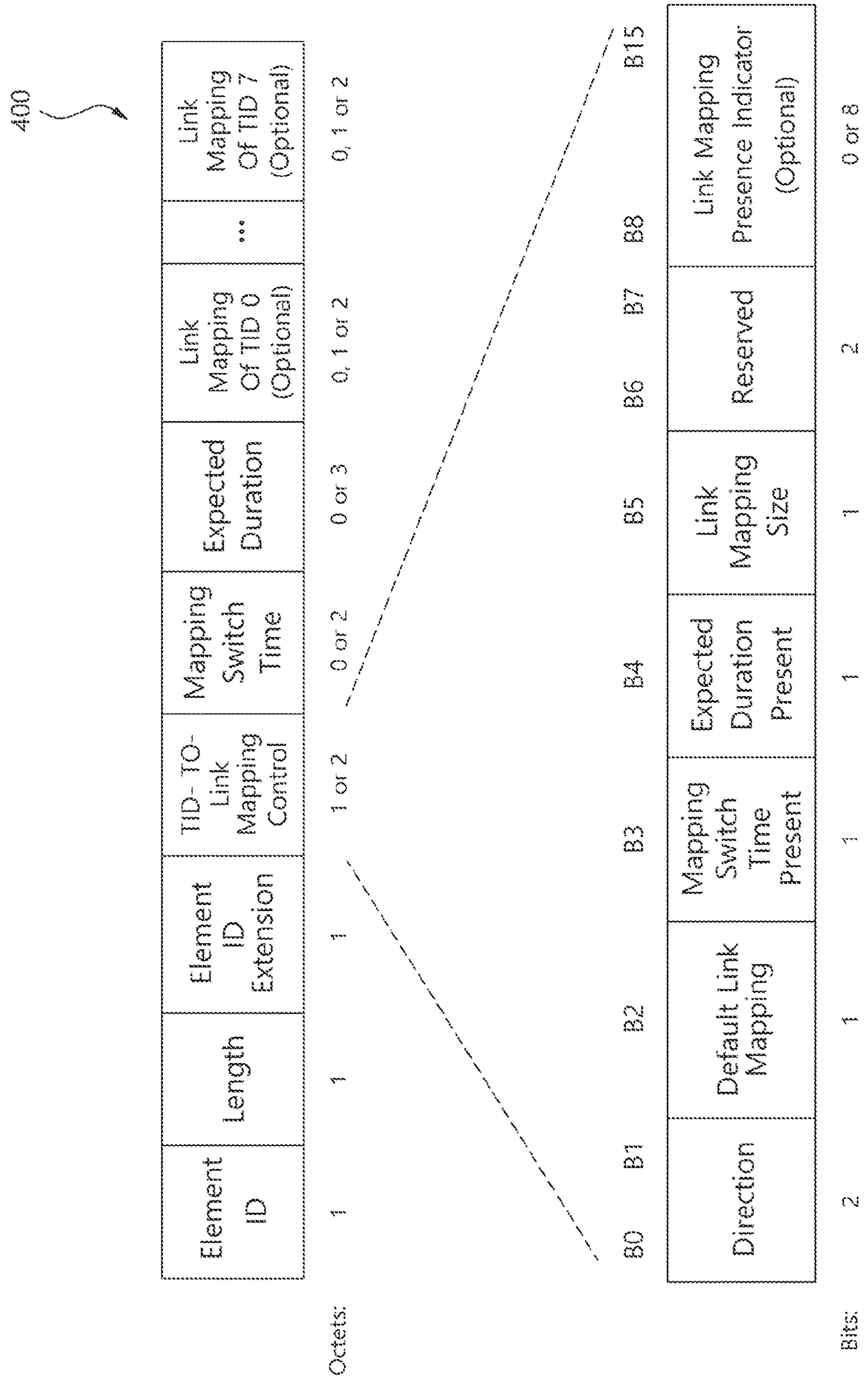
FIG. 4 shows an example of a TID-to-Link Mapping element in accordance with an embodiment.

FIG. 4 shows an example of a TID-to-Link Mapping element 400 in accordance with an embodiment. This example of FIG. 4 may be applicable to IEEE 802.11be standard and any of future amendments to IEEE 802.11 standard. The TID-to-Link Mapping element 400 may indicate the links on which frames belongings to each TID may be exchanged.

As shown in FIG. 4, the TID-to-Link Mapping element 400 may include an Element ID field, a Length field, an Element ID Extension field, a TID-to-Link Mapping Control field, a Mapping Switch Time field, an Expected Duration field, and optional Link Mapping of TID n fields.

The Element ID field and the Element ID Extension field may include information to identify the TID-to-Link Mapping element 400. The Length field may indicate a length of the TID-to-Link Mapping element 400.

The TID-to-Link Mapping Control field may include a Direction subfield, a Default Link Mapping subfield, a Mapping Switch Time Present subfield, an Expected Duration Present subfield, a Link Mapping Size subfield, a Reserved subfield, and an optional Link Mapping Presence Indicator subfield. The Direction subfield may indicate if the TID-to-Link Mapping element 400 is for downlink frames, uplink frames, or both. For example, the Direction subfield may be set to 0 for downlink frames, 1 for uplink frames, and 2 for frames transmitted both on downlink and uplink. The Default Link Mapping subfield may indicate if the TID-to-Link Mapping element 400 represents default TID-to-link mapping. For example, the subfield may be set to 1 for default mapping and 0 for non-default mapping. The Mapping Switch Time Present subfield may indicate if the Mapping Switch Time field is present in the TID-To-Link Mapping element 400. The Expected Duration Present subfield may indicate if the Expected Duration field is present in the TID-To-Link Mapping element 400. The Link Mapping Size subfield may indicate the length of the Link Mapping of TID n field. The Link Mapping Presence Indicator subfield may indicate whether the Link Mapping of TID n fields are present in the TID-To-Link Mapping element 400.

The Mapping Switch Time field is present when the TID-to-Link Mapping element 400 is transmitted by an AP affiliated with an AP MLD in a beacon or probe response frame and the indicated TID-to-link mapping is not yet established.

The Expected Duration field may indicate the duration for which the proposed TID-to-link mapping is expected to be effective when the Mapping Switch Time field is present, and the remaining duration for which the proposed TID-to-link mapping is expected to be effective when the Mapping Switch Time field is not present.

The Link Mapping of TID n field (where n=0, 1, . . . , 7, for example) may indicate the links on which frames belonging to the TID n are allowed to be sent. The Link Mapping of TID n fields may carry a bitmap of the links to which the TID n is mapped. When the Default Link Mapping subfield of the TID-To-Link Mapping Control field represents default TID-to-link mapping, the Link Mapping of TID n fields may not be present. For example, when the Direction subfield is set to 0, the Default Link Mapping subfield is set to 0, and the Link Mapping of TID 0 field is configured to 10000 . . . 0, this configuration indicates that downlink data corresponding TID 0 is transmitted on Link 1.

The TID-to-Link Mapping element 400 may be included in various management frames, for example, a beacon frame, an association request/response frame, a re-association request/response frame, or a probe response frame.

The IEEE 802.11be standard introduces restricted target wake time (R-TWT) operation to provide better support for latency sensitive applications. The R-TWT operation, which is based on a broadcast TWT operation, is a feature that provides enhanced medium access protection and resource reservation for delivery of latency sensitive traffic.

The R-TWT operation provides a protected service period (SP) for the R-TWT member STAs by sending one or more Quiet elements to other STAs in the BSS which are not members of the R-TWT. The quiet interval, indicated by the Quiet elements, overlaps with an initial portion of the R-TWT SP. Therefore, it may provide more channel access opportunities for R-TWT member STAs and it may certainly help improve the flow of latency-sensitive traffic.

Figure 5:
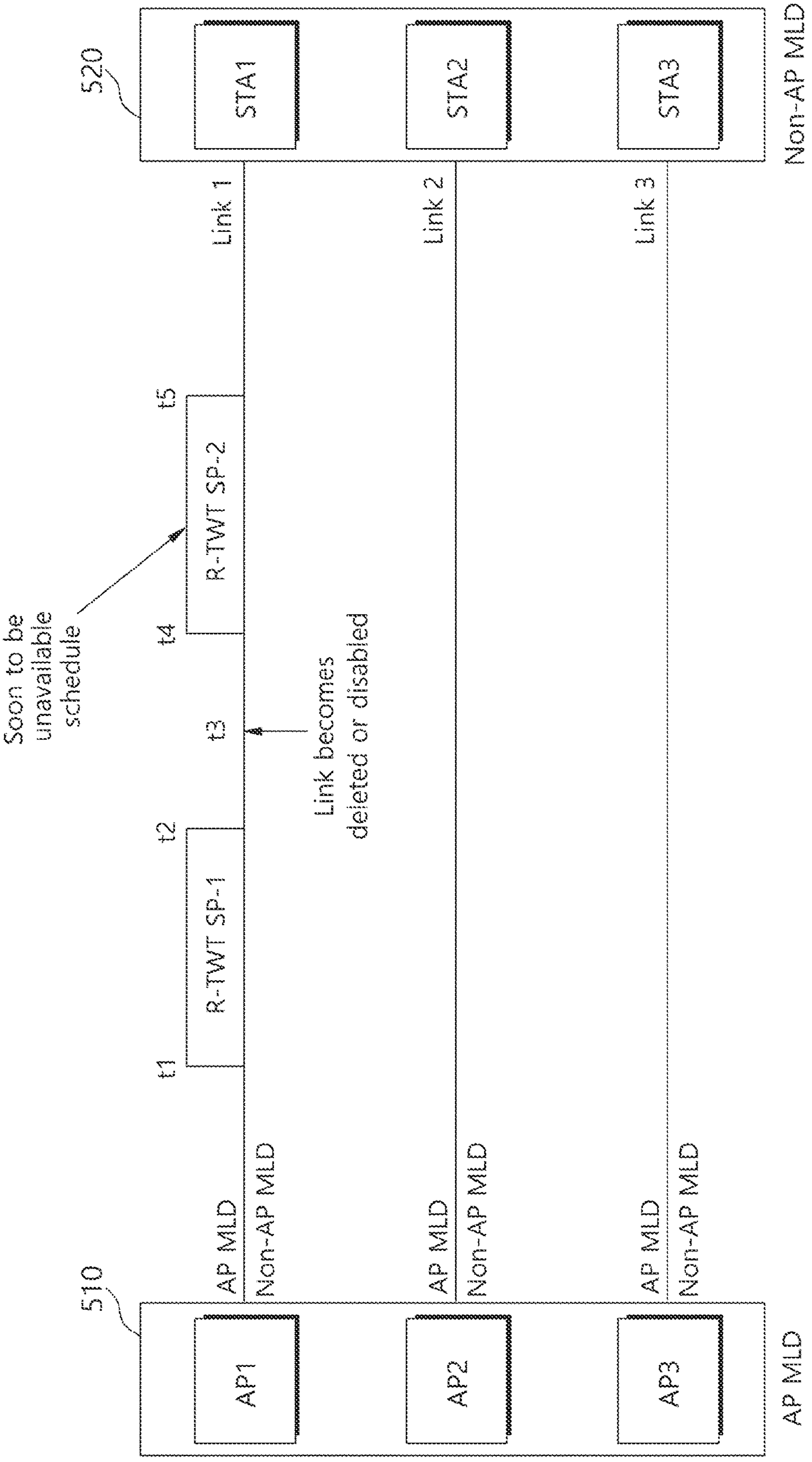
FIG. 5 shows an example of wireless communication in accordance with an embodiment.

FIG. 5 shows an example of wireless communication in accordance with an embodiment. This example may be applicable to IEEE 802.11be standard and any future amendments to IEEE 802.11 standard. The AP MLD 510 and the non-AP MLD 520 may be examples of the AP MLD 310 and the non-AP MLD 320 illustrated in FIG. 3, respectively. The AP MLD 510 may include three affiliated APs (AP 1, AP 2, and AP 3), and the non-AP MLD 520 may include three affiliated STAs (STA 1, STA 2, and STA 3). AP 1 and STA 1 may operate on Link 1, AP 2 and STA 2 may operate on Link 2, and AP 3 and STA 3 may operate on Link 3. Link 1 may use the 2.4 GHz frequency band, Link 2 may use the 5 GHz frequency band, and Link 3 may use the 6 GHz frequency band.

In FIG. 5, an R-TWT schedule may be established on Link 1. A first R-TWT SP (R-TWT SP-1) may start at time t1 and end at time t2. A second R-TWT SP (R-TWT SP-2) may start at time t4 and end at time t5. However, Link 1 may be scheduled to be deleted or disable at time t3 for certain reasons. For example, Link 1 may be muted or become unavailable due to power saving purposes or regulatory reasons. The AP MLD 510 had established the R-TWT schedule on Link 1 for latency sensitive traffic. Hence, if the second R-TWT SP (R-TWT SP-2) is unavailable for the non-AP MLD 520, the latency sensitive traffic for the non-AP MLD 520 would be affected. Similar situations may occur for other non-AP MLDs (not shown in FIG. 5) that are associated with the AP MLD 510 and have R-TWT schedules established on Link 1. Therefore, the AP MLD 510 needs a mechanism to establish a replacement R-TWT schedule on a different link (e.g., Link 2 or Link 3) before the R-TWT schedule on Link 1 becomes unavailable. Such a mechanism may allow the non-AP MLD 520 and the AP MLD 510 to seamlessly exchange latency-sensitive traffic or bufferable units (BUs) on another link before Link 1 becomes unavailable. Currently, IEEE 802.11 standard does not provide such a mechanism. Therefore, the AP MLD 510 and the non-AP MLD 520 need to renegotiate another R-TWT schedule on alternative link, which may not be a seamless process. Furthermore, there may be multiple non-AP MLDs that have R-TWT schedules on Link 1 in the BSS. If the AP MLD 510 needs to perform 1-to-1 negotiation with all the non-AP MLDs to establish replacement R-TWT schedules on alternative links, it may take a significant amount of time. Consequently, a non-AP MLD carrying latency sensitive traffic may be affected by the excessive time required for negotiation for the replacement R-TWT schedule. This situation will cause problems with the non-AP MLD with latency sensitive applications.

This present disclosure provides a mechanism to transition an R-TWT schedule from one link to another link in a broadcast manner. In some implementations, an AP affiliated with an AP MLD may announce in its BSS that a first R-TWT schedule established in a first link is about to become unavailable due to certain reasons, for example, link deletion or link disablement. Further, the AP affiliated with the AP MLD may announce that one or more alternative R-TWT schedules are established on one or more alternative links for one or more the associated non-AP MLDs that are operating on the first link and have R-TWT membership for the first R-TWT schedules. In this disclosure, the alternative R-TWT schedule on the alternative link may be referred to as a replacement R-TWT schedule or a link replacement R-TWT schedule. In some implementations, the AP MLD may make the announcement regarding the link status (e.g., link replacement) using a new element. The new element may be included in a broadcast frame, such as a beacon frame or a probe response frame, transmitted on any link between the AP MLD and the non-AP MLD. In some implementations, the AP MLD may unilaterally establish the replacement R-TWT schedule on the alternative link for all non-AP MLD associated with the AP MLD. Therefore, negotiation for the replacement R-TWT schedule may not be necessary.

Figure 6:
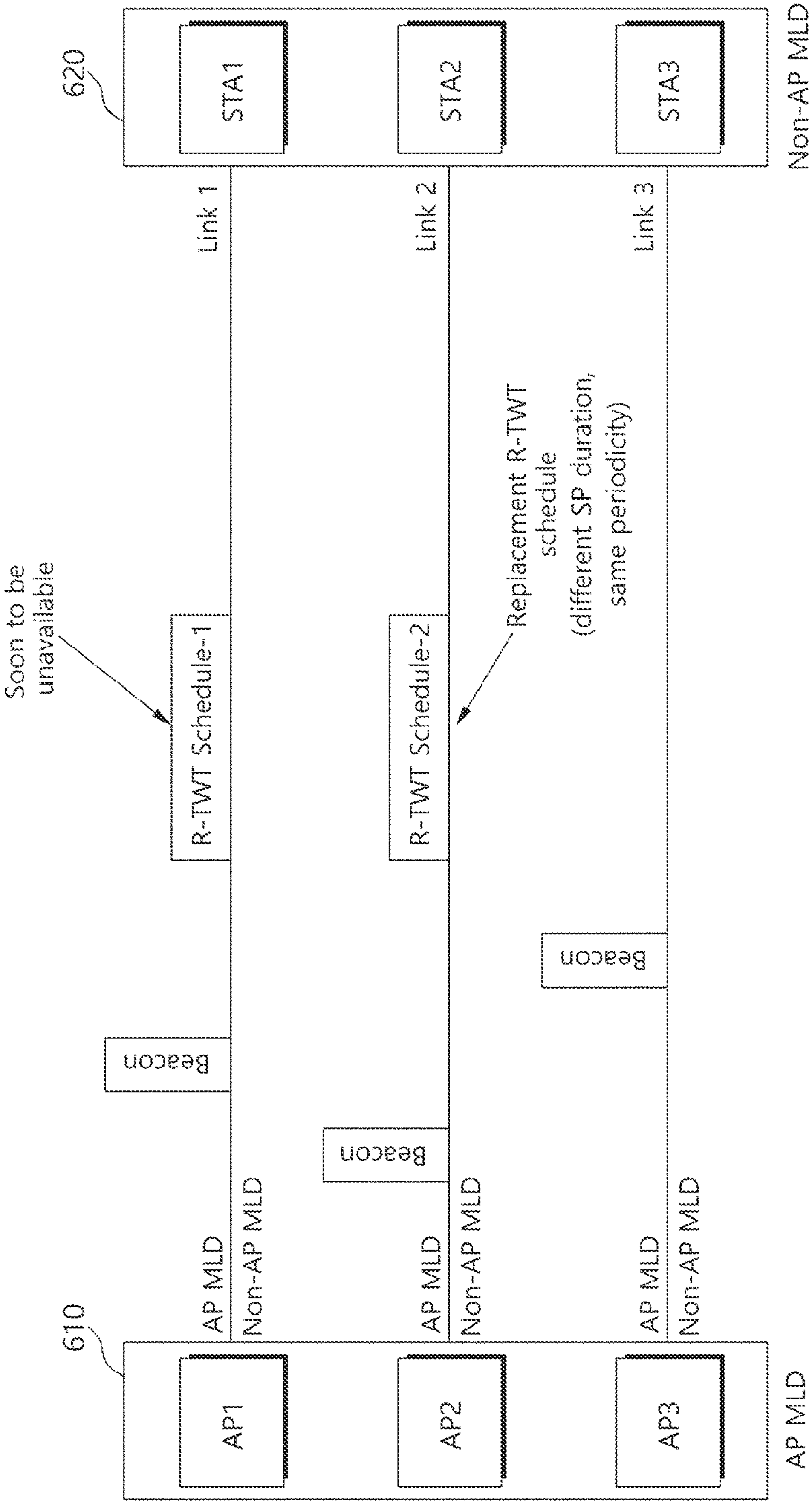
FIG. 6 shows an example of wireless communication in accordance with an embodiment.

FIG. 6 shows an example of wireless communication in accordance with an embodiment. This example may be applicable to IEEE 802.11be standard and any future amendments to IEEE 802.11 standard. The AP MLD 610 and the non-AP MLD 620 may be examples of the AP MLD 310 and the non-AP MLD 320 illustrated in FIG. 3, respectively. The AP MLD 610 may include three affiliated APs (AP 1, AP 2, and AP 3), and the non-AP MLD 620 may include three affiliated STAs (STA 1, STA 2, and STA 3). AP 1 and STA 1 may operate on Link 1 (a first link), AP 2 and STA 2 may operate on Link 2 (a second link), and AP 3 and STA 3 may operate on Link 3 (a third link). Link 1, Link 2, and Link 3 may use the 2.4 GHz frequency band, the 5 GHz frequency band, and the 6 GHz frequency band, respectively.

In FIG. 6, a first R-TWT schedule (R-TWT Schedule-1) is established on Link 1. The AP MLD 610 may transmit beacon frames including an R-TWT link replacement element via all links between the AP MLD 610 and the non-AP MLD 620. In some implementations, the AP MLD 610 may transmit one or more beacon frames including an R-TWT link replacement element via a part of all links, including alternative link, between the AP MLD 610 and the non-AP MLD 620. The R-TWT link replacement element is configured to announce that the first R-TWT schedule on Link 1 is about to become unavailable and, as a replacement, a second R-TWT schedule (R-TWT Schedule-2) will be established on Link 2 from the time indicated by the R-TWT link replacement element. In some implementations, the R-TWT link replacement element may be included in a probe response frame transmitted from the AP MLD 610.

When the STA 1 of the non-AP MLD 620 has obtained a membership of the first R-TWT schedule on Link 1 and the non-AP MLD 620 receives the R-TWT link replacement element included in the beacon frame, the second R-TWT schedule may start from the time indicated in a link replacement time subfield of the R-TWT link replacement element. Further, the first R-TWT schedule on Link 1 may be suspended for the STA 1 of the non-AP MLD 620 at the time indicated in the link replacement time subfield of the R-TWT link replacement element. The STA 2 of the non-AP MLD 620 becomes a member of the second R-TWT schedule on Link 2. In FIG. 6, the second R-TWT schedule (R-TWT Schedule-2) on Link 2 is the replacement R-TWT schedule. The second R-TWT schedule (R-TWT Schedule-2) in FIG. 6 may have different SP duration but the same periodicity as that of the first R-TWT schedule (R-TWT Schedule-1).

Figure 7:
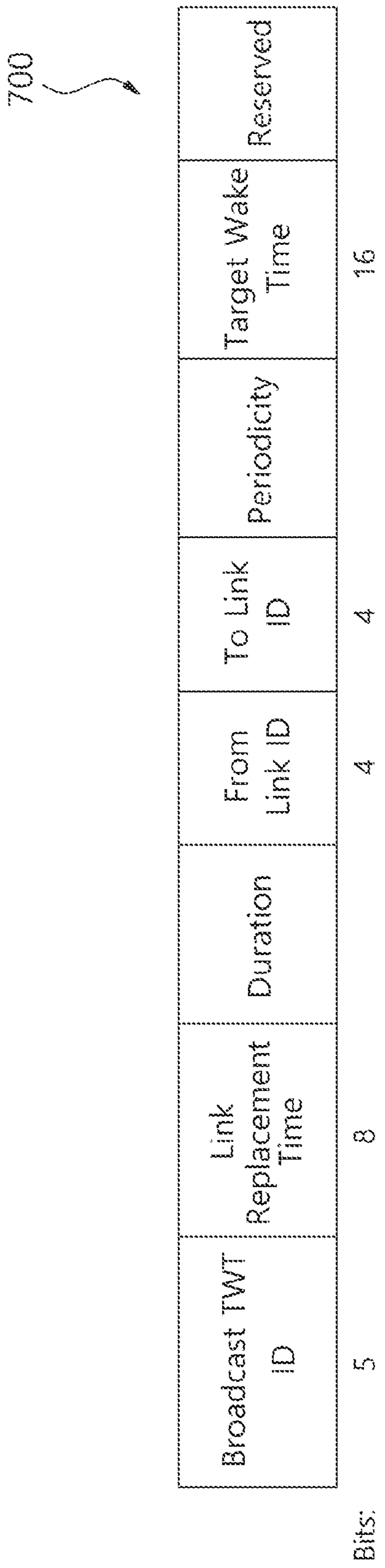
FIG. 7 shows an example of an R-TWT Link Replacement element in accordance with an embodiment.

FIG. 7 shows an example of an R-TWT Link Replacement element in accordance with an embodiment. This example may be applicable to IEEE 802.11be standard and any future amendments to IEEE 802.11 standard.

In FIG. 7, the R-TWT Link Replacement element 700 may include a Broadcast TWT ID field, a Link Replacement Time field, a Duration field, a From Link ID field, a To Link ID field, a Periodicity field, a Target Wake Time field, and a Reserved field.

Referring to FIG. 6 and FIG. 7, the Broadcast TWT ID field may indicate the broadcast TWT ID corresponding to a first R-TWT schedule on the first link (Link 1) which is indicated by the From Link ID field. When both the first R-TWT schedule on Link 1 and the second R-TWT schedule on Link 2 have the same broadcast TWT ID, both the broadcast TWT IDs may be identified by the Broadcast TWT ID field. In some implementations, the first R-TWT schedule on Link 1 and the second R-TWT schedule on Link 2 may have different broadcast TWT IDs. In this case, the R-TWT Link Replacement element may include two Broadcast TWT ID fields: a Previous Broadcast TWT ID field and a Replacement Broadcast TWT ID field. Accordingly, the first broadcast TWT ID on Link 1 may be identified by the Previous Broadcast TWT ID field, and the second broadcast TWT ID on Link 2 may be identified by the Replacement Broadcast TWT ID field.

The Link Replacement Time field may indicate the time at which the R-TWT schedule is moved from the first link to second link (i.e., alternative link). In some implementations, the Link Replacement Time field may be specified in terms of target beacon transmission time (TB TT).

The Duration field may indicate the amount of time of the service period (SP) of a replacement TWT schedule on the alternative link. In the example of FIG. 6, the Duration subfield may indicate the SP of the second TWT schedule on Link 2.

The From Link ID field may indicate the link of an AP MLD from which the R-TWT schedule is moved to alternative link. The To Link ID field may indicate the link of an AP MLD onto which the R-TWT schedule is moved. In the example of FIG. 6, the From Link ID field and the To Link ID field may indicate Link 1 and Link 2, respectively.

The periodicity field may indicate a periodicity of the replacement R-TWT schedule on the alternative link. The Target Wake Time field may indicate a target wake time of the replacement R-TWT schedule on the alternative link. In the example of FIG. 6, the periodicity field and the Target Wake Time field may indicate the periodicity and the target wake time of the second R-TWT schedule on Link 2.

In some implementations, one or more parameters of the second R-TWT schedule on the second link may be the same as those of the first R-TWT schedule on the first link.

In some implementations, parameters of the second R-TWT schedule on the second link which are not included in the R-TWT Link Replacement element may be the same as those of the first R-TWT schedule on the first link.

In some implementations, when an AP MLD establishes a replacement R-TWT schedule on a second link as a replacement for a first R-TWT schedule on a first link, an STA of the same non-AP MLD operating on the second link become a member of the replacement R-TWT schedule from the time indicated in the Link Replacement Time field if the non-AP MLD also operates on the second link.

In some implementations, the SP duration of the replacement R-TWT schedule on the second link may be different than the SP duration of the first R-TWT schedule on the first link. The SP duration of the replacement R-TWT schedule may be adjusted to account for the operating channel, frequency, and bandwidth of the second link, in comparison with the first link.

Figure 8:
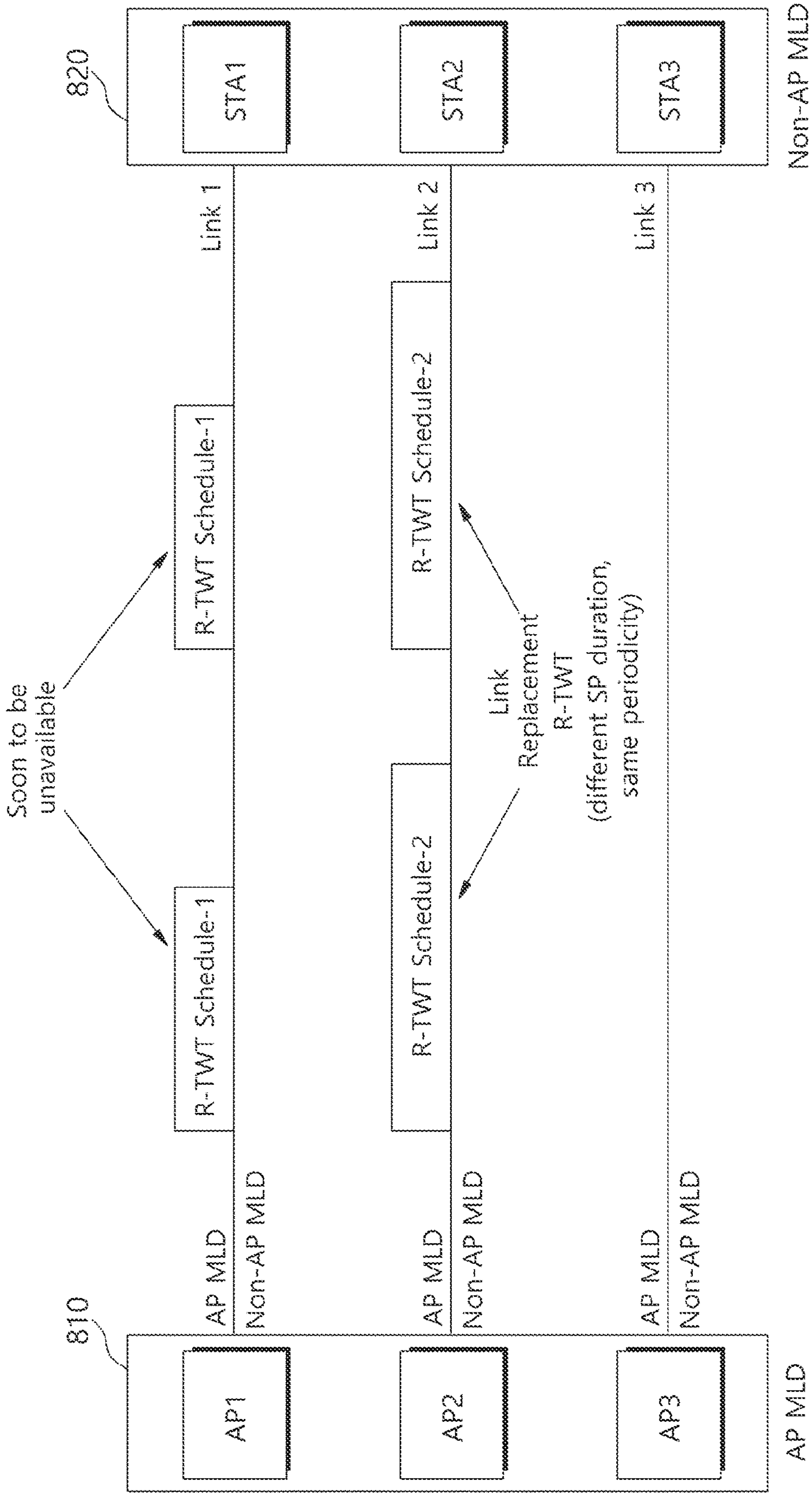
FIG. 8 shows an example of wireless communication in accordance with an embodiment.

FIG. 8 shows an example of wireless communication in accordance with an embodiment. This example may be applicable to IEEE 802.11be standard and any future amendments to IEEE 802.11 standard. The AP MLD 810 and the non-AP MLD 820 may be examples of the AP MLD 310 and the non-AP MLD 320 illustrated in FIG. 3, respectively. The AP MLD 810 may include three affiliated APs (AP 1, AP 2, and AP 3), and the non-AP MLD 820 may include three affiliated STAs (STA 1, STA 2, and STA 3). AP 1 and STA 1 may operate on Link 1 (a first link), AP 2 and STA 2 may operate on Link 2 (a second link), and AP 3 and STA 3 may operate on Link 3 (a third link). Link 1, Link 2, and Link 3 may use the 2.4 GHz frequency band, the 5 GHz frequency band, and the 6 GHz frequency band, respectively.

In FIG. 8, two R-TWT schedules (R-TWT Schedule-1) may be established on Link 1. The STA 1 affiliated with the non-AP MLD 820 may be a member of both R-TWT schedules. Link 1 may be scheduled to be unavailable for certain reasons. Before Link 1 becomes unavailable, the AP MLD 810 may announce in its BSS that both R-TWT schedules (R-TWT Schedule-1) may be replaced with another two R-TWT schedules (R-TWT Schedule-2) on Link 2. The STA 2 of the non-AP MLD 820 becomes a member of the new R-TWT schedules on Link 2. In some implementations, any AP affiliated with the AP MLD 810 may announce the time at which the replacement R-TWT schedules will be in effect if an AP affiliated with the AP MLD 810 intends to establish the replacement R-TWT schedule on an alternative link. The replacement R-TWT schedule may have different SP duration but the same periodicity.

In some embodiments, an R-TWT Broadcast Link Assignment element may be included in a beacon frame or a probe response frame transmitted by of the AP MLD 810 when any AP affiliated with the AP MLD 810 intends to establish the replacement R-TWT schedule on an alternative link. The R-TWT Broadcast Link Assignment element may be included in a per-STA Profile sub-element of the Basic Multi-Link element. The R-TWT Broadcast Link Assignment element may include, but not limited to, the following fields:

- a time field indicating when the R-TWT schedule on the first link is scheduled to be unavailable and the replacement R-TWT schedule will be in effect to replace the R-TWT schedule. The time may be expressed in terms of TBTT;
- a service period (SP) field indicating the SP of the replacement R-TWT;
- a Target Wake Time field indicating the target wake time of the replacement R-TWT;
- a Periodicity field indicating the periodicity of the replacement R-TWT;
- a From Link ID field indicating the link of an AP MLD from which the R-TWT schedule is moved to the alternative link;
- a To Link ID field indicating the link of an AP MLD onto which the R-TWT schedule is moved; and
- a Broadcast TWT ID field indicating the broadcast TWT ID corresponding to the R-TWT schedule on the first link which is indicated by the From Link ID subfield.

Various subfields of the R-TWT Broadcast Link Assignment element are the same as or similar to corresponding field of the R-TWT Link Replacement element in FIG. 7.

In some embodiments, when the AP MLD establishes the replacement TWT schedule on the second link as a replacement of the first R-TWT schedule on the first link, the TIDs that are applicable for the replacement R-TWT schedule on the second link may be the same as the TIDs that are applicable for the first R-TWT schedule on the first link from the time indicated by R-TWT Broadcast Link Assignment element.

In some embodiments, when the AP MLD establishes the replacement R-TWT schedule on the second link as a replacement of the first R-TWT schedule on the first link, the TIDs mapped on the first link are also mapped on the second link from the time indicated by R-TWT Broadcast Link Assignment element.

In some embodiments, when the AP MLD establishes the replacement R-TWT schedule on the second link as a replacement of the first R-TWT schedule on the first link, the TIDs negotiated for the first R-TWT schedule on the first link are mapped on the second link from the time indicated by R-TWT Broadcast Link Assignment element.

In some embodiments, when the AP MLD establishes the replacement R-TWT schedule on the second link as a replacement of the first R-TWT schedule on the first link, the non-AP MLD falls into the default mapping. Accordingly, all TIDs are mapped to all the links between the AP MLD and the non-AP MLD.

Figure 9:
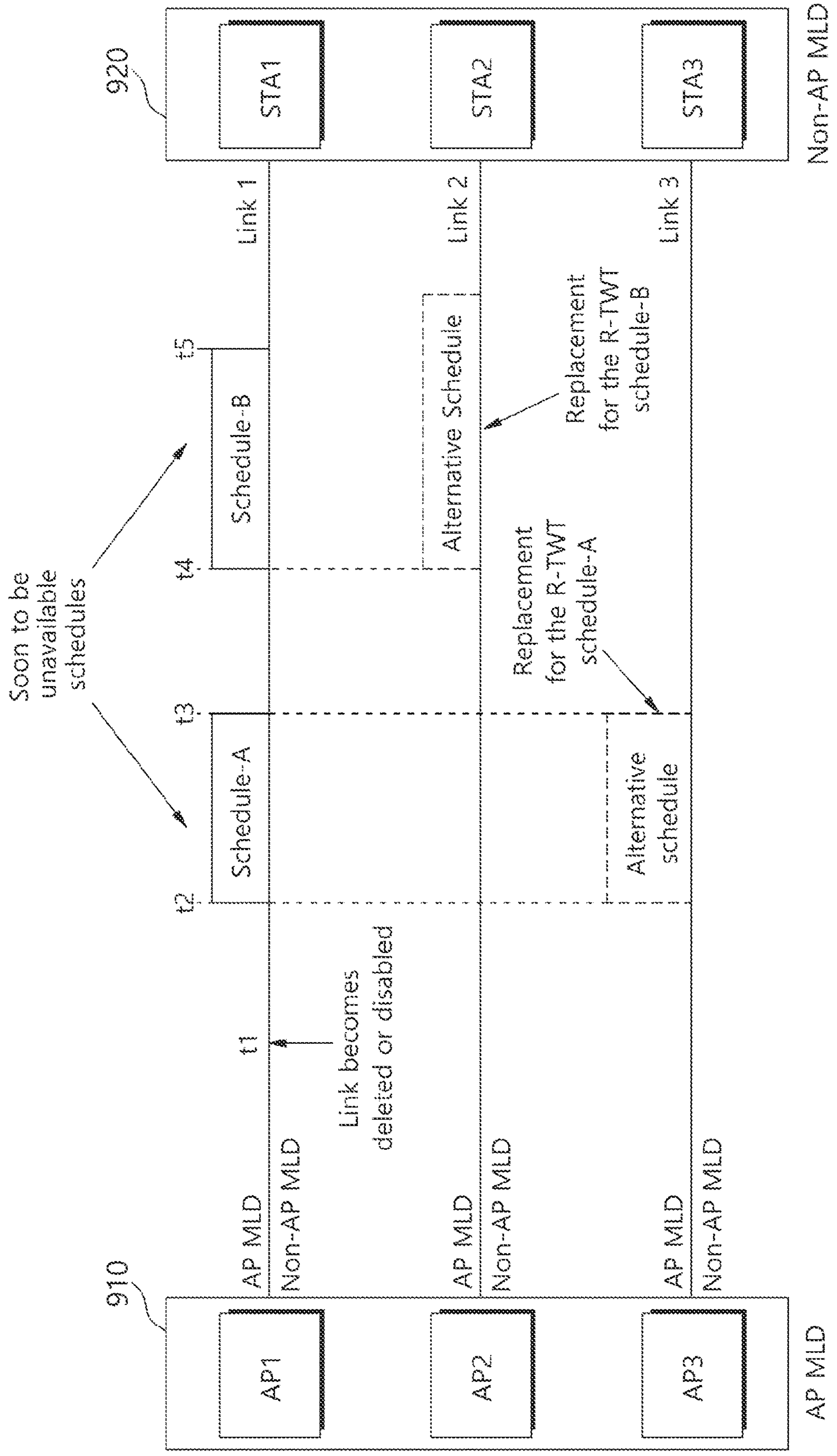
FIG. 9 shows an example of wireless communication in accordance with an embodiment.

FIG. 9 shows an example of wireless communication in accordance with an embodiment. This example may be applicable to IEEE 802.11be standard and any future amendments to IEEE 802.11 standard. The AP MLD 910 and the non-AP MLD 920 may be examples of the AP MLD 310 and the non-AP MLD 320 illustrated in FIG. 3, respectively. The AP MLD 910 may include three affiliated APs (AP 1, AP 2, and AP 3), and the non-AP MLD 920 may include three affiliated STAs (STA 1, STA 2, and STA 3). AP 1 and STA 1 may operate on Link 1 (a first link), AP 2 and STA 2 may operate on Link 2 (a second link), and AP 3 and STA 3 may operate on Link 3 (a third link). Link 1, Link 2, and Link 3 may use the 2.4 GHz frequency band, the 5 GHz frequency band, and the 6 GHz frequency band, respectively.

In FIG. 9, two R-TWT schedules of a first R-TWT schedule (Schedule-A and Schedule-B) may be established on Link 1. The STA 1 affiliated with the non-AP MLD 920 may be a member of both R-TWT schedules. Link 1 may be about to be unavailable starting from time t1 for certain reasons. Before Link 1 becomes unavailable, the AP MLD 910 may announce in its BSS that Schedule-A on Link 1 is replaced by Alternative Schedule on Link 3, and Schedule-B on Link 1 is replaced by Alternative Schedule on Link 2. The Alternative Schedule on Link 3 is a replacement for Schedule-A of the first R-TWT schedule on Link 1, and the Alternative Schedule on Link 2 is a replacement for Schedule-B of the first R-TWT schedule on Link 1. Accordingly, STA 3 of the non-AP MLD 920 becomes a member of new R-TWT schedule on Link 3, and STA 2 of the non-AP MLD 920 becomes a member of new R-TWT schedule on Link 2.

Figure 10A:
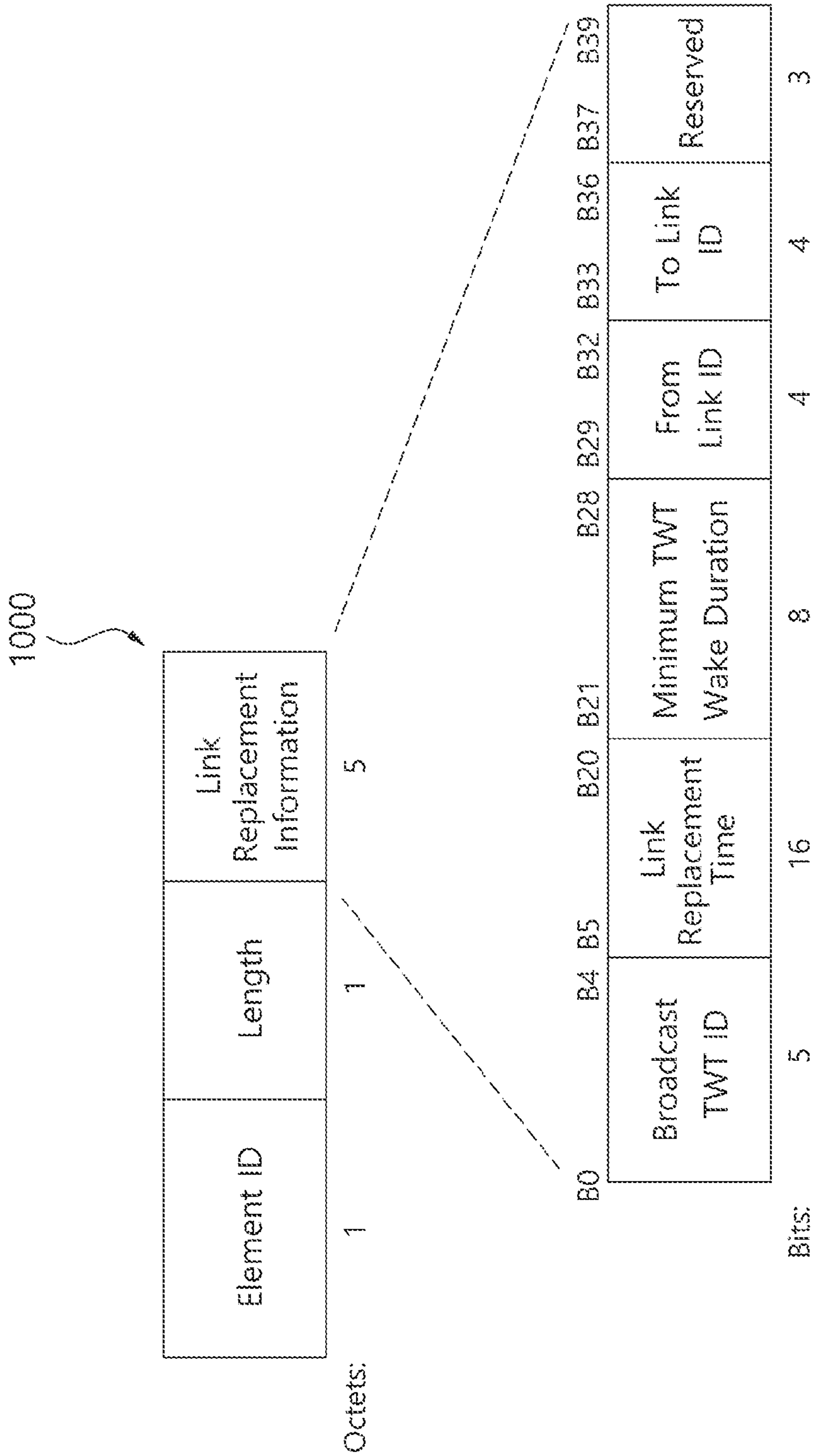
FIGS. 10A and 10B show examples of an R-TWT Link Replacement element format in accordance with an embodiment.

FIG. 10A shows an example of an R-TWT Link Replacement element format in accordance with an embodiment. This example may be applicable to IEEE 802.11be standard and any future amendments to IEEE 802.11 standard.

The R-TWT Link Replacement element 1000 may include an Element ID field, a Length field, and a Link Replacement Information field. The Element ID field may include information to identify the R-TWT Link Replacement element. The Length field may indicate the length of the R-TWT Link Replacement element. The Link Replacement Information field may include a Broadcast TWT ID subfield, a Link Replacement Time subfield, a Minimum TWT Wake Duration subfield, a From Link ID subfield, a To Link ID subfield, and a Reserved subfield.

The Broadcast TWT ID subfield may indicate the broadcast TWT ID corresponding to the R-TWT schedule that is moved from one link (e.g., a first link) onto another link (e.g., a second link) between an AP MLD and a non-AP MLD, using the R-TWT Link Replacement element.

The Link Replacement Time subfield may include a positive unsigned integer corresponding to a timing synchronization function (TSF) time at which the R-TWT schedule identified by the Broadcast TWT ID subfield is moved from one link (e.g., the first link) onto another link (e.g., the second link). The TSF time indicated in the Link Replacement Time subfield may be with respect to the TSF of the link from which the R-TWT schedule is moved.

The Minimum TWT Wake Duration subfield may indicate the minimum amount of time that the R-TWT scheduled STA is expected to be awake during for the period of TWT wake interval corresponding to the replacement R-TWT schedule on the link onto which the R-TWT schedule is moved. The unit of Minimum TWT Wake Duration subfield value of the Broadcast TWT Link Replacement element is the same as that of the Nominal Minimum TWT Wake Duration subfield of the original R-TWT schedule on the link indicated in the From Link ID subfield.

The From Link ID subfield may indicate the link (e.g., the first link) of an AP MLD from which the R-TWT schedule is moved to another link (e.g., the second link).

The To Link ID subfield may indicate the link (e.g., the second link) of an AP MLD where the R-TWT schedule is moved to.

Figure 10B:
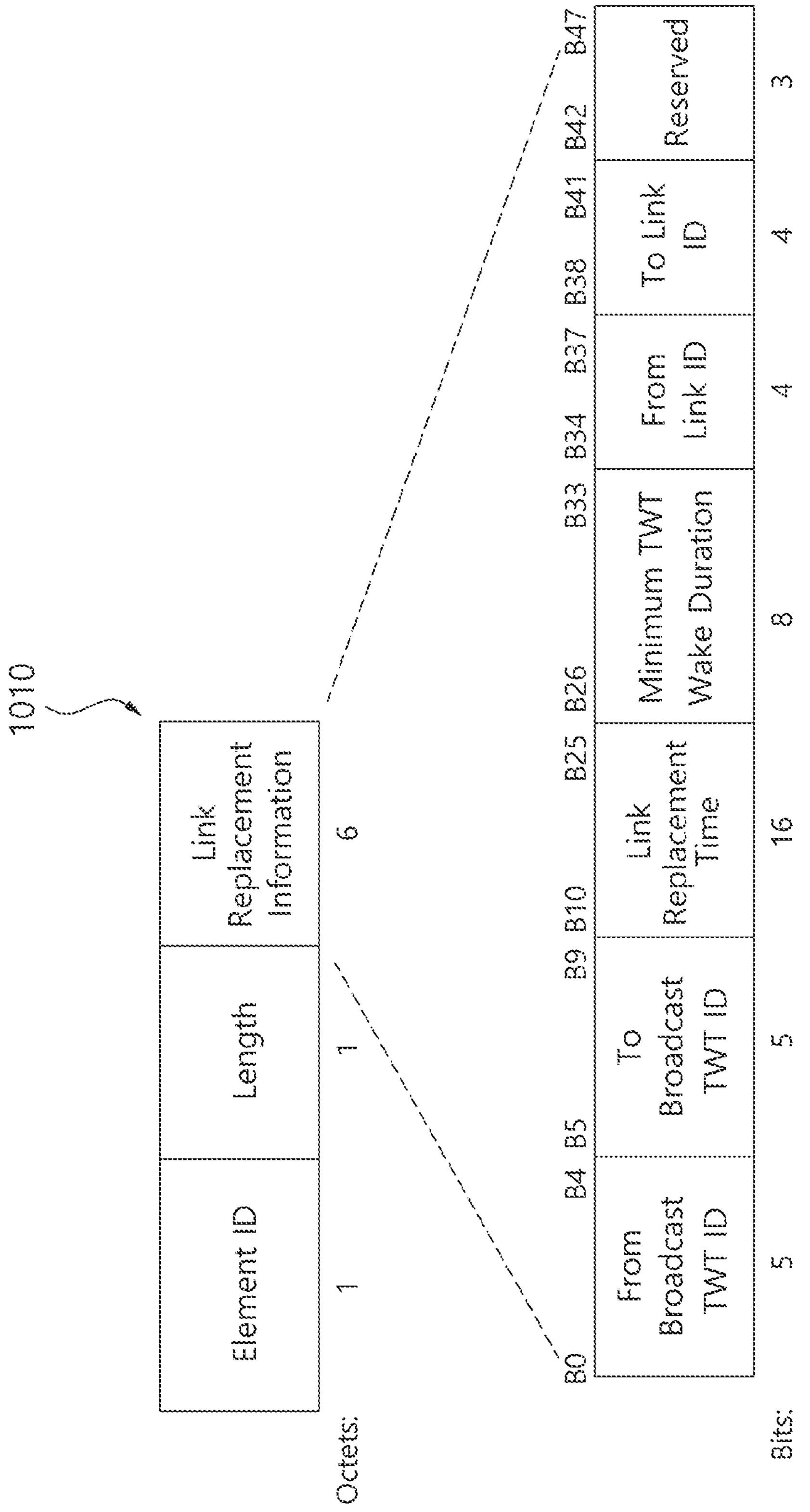

FIG. 10B shows another example of the R-TWT Link Replacement element format in accordance with an embodiment. This example may be applicable to IEEE 802.11be standard and any future amendments to IEEE 802.11 standard.

The various fields in the R-TWT Link Replacement element 1010 in FIG. 10B may be the same as or similar to the R-TWT Link Replacement element 1000 in FIG. 10A, with the exception of a part of the Link Replacement Information field.

In FIG. 10B, the Link Replacement Information field may include two Broadcast TWT ID subfields: From Broadcast TWT ID subfield and To Broadcast TWT ID subfield. Meanwhile, the Link Replacement Information field in FIG. 10A has one Broadcast TWT ID subfield.

The From Broadcast TWT ID subfield may indicate the broadcast TWT ID corresponding to the R-TWT schedule that is moved from one link (e.g., a first link) indicated by the From Link ID subfield, onto another link (e.g., a second link) between an AP MLD and a non-AP MLD using the R-TWT Link Replacement element.

The To Broadcast TWT ID subfield may indicate the broadcast TWT ID corresponding to the replacement R-TWT schedule that established on one link (e.g., the second link) indicated by the To Link ID subfield, to which the original R-TWT schedule is moved using the R-TWT Link Replacement element.

In various embodiments, when a first R-TWT schedule is established on a first link and the first link is scheduled to be unavailable, the AP MLD may announce that the first R-TWT schedule on the first link may be unavailable and a second R-TWT schedule may be established on a second link using an R-TWT Link Replacement element in a beacon frames or a probe response frame. The replacement R-TWT schedule (second R-TWT schedule) may be in effect from the time indicated by the Link Replacement Time subfield of the R-TWT Link Replacement element.

In some embodiments, a first STA affiliated with a non-AP MLD associated with an AP MLD has obtained a membership of a first R-TWT schedule on a first link. The non-AP MLD may receive an R-TWT Link Replacement element included in a beacon frame or a probe response frame. The R-TWT Link Replacement element may indicate that the first R-TWT schedule on the first link is scheduled to be unavailable and a second R-TWT schedule is established on a second link between the AP MLD and the non-AP MLD as a replacement. Then, the first R-TWT schedule on the first link may be suspended for the first STA at the time indicated in the Link Replacement Time subfield of the R-TWT Link Replacement element. A second STA affiliated with the non-AP MLD may become a member of the second R-TWT schedule on the second link, starting from the time indicated in the Link Replacement Time subfield of the R-TWT Link Replacement element. The first link and the second link may be identified by From Link ID subfield and To Link ID subfield of the R-TWT Link Replacement element, respectively. The first R-TWT schedule on the first link may be specified by the Broadcast TWT ID subfield of the R-TWT Link Replacement element. The minimum wake duration of the second R-TWT schedule on the second link is indicated by the Minimum TWT Wake Duration subfield of the R-TWT Link Replacement element. Other TWT parameters of the second R-TWT schedule on the second link may remain the same as the TWT parameters of the first R-TWT schedule on the first link. In an embodiment, the broadcast TWT ID of the second R-TWT schedule on the second link may be the same as the broadcast TWT ID of the first R-TWT schedule on the first link. It may be identified by the Broadcast TWT ID subfield of the R-TWT Link Replacement element. Alternatively, the broadcast TWT ID of the second R-TWT schedule on the second link may be different from the broadcast TWT ID of the first R-TWT schedule on the first link.

In some implementations, a beacon frame may include the R-TWT Link Replacement element. Table 1 shows an example of a beacon frame body which includes the R-TWT Link Replacement element in the last row.

TABLE 1

| Order | Information | Notes |
|---|---|---|
| 12 | Quiet | The Quiet element is optionally present if dot11SpectrumManage-mentRequired is true or dot11RadioMeasurementActivated is true or dot11RestrictedTWTOptionImplemented is true. |
| <Last assigned + 1> | Multi-Link | If dot11MultiLinkActivated is true, the Basic Multi-Link element is present and the Reconfiguration Multi-Link element is optionally present (see 35.3.6.2.2 (Removing affiliated APs)); otherwise, Multi-Link element is not present. |
| <Last assigned + 2> | EHT Capabilities | The EHT Capabilities element is present if dot11EHTOptionImplemented is true; otherwise, it is not present. |
| <Last assigned + 3> | EHT Operation | The EHT Operation element is present if dot11EHTOptionImplemented is true; otherwise, it is not present. |
| <Last assigned + 4> | Multi-Link Traffic Indication | The Multi-Link Traffic Indication element is present if dot11MultiLinkTIMActivated is true; otherwise it is not present. |
| <Last assigned + 5> | TID-To-Link Mapping | One or two TID-To-Link Mapping elements are optionally present if dot11MultiLinkActivated and dot11TIDtoLinkMappingActivated are true; otherwise, none are present. |

TABLE 1-continued

| Order | Information | Notes |
|---|---|---|
| | | If two TID-To-Link Mapping elements are present, the Mapping Switch Time subfield is present in one of the TID-To-Link Map- ping elements and not present in the other TID-To-Link Mapping element. |
| <Last assigned + 6> | R-TWT Link Replacement | According to one embodiment, One or more R-TWT Link Replacement elements are optionally present if dot11MultiLinkActivated, dot11RestrictedTWTOptionImplemented, and dot11RTWTLinkReplacementOptionImplemented are true; otherwise, none are present. |

In some implementations, a probe response frame may include the R-TWT Link Replacement element. Table 2 shows an example of a probe response frame body which includes the R-TWT Link Replacement element in the last row.

TABLE 2

| Order | Information | Notes |
|---|---|---|
| <Last assigned + 3> | EHT Operation | The EHT Operation element is present if dot11EHTOptionImple- mented is true; otherwise it is not present. |
| <Last assigned + 4> | TID-To-Link Mapping | One or two TID-To-Link Mapping elements are optionally present if dot11MultiLinkActivated and dot11TIDtoLinkMappingActi- vated are true; otherwise, none are present. If two TID-To-Link Mapping elements are present, the Mapping Switch Time subfield is present in one of the TID-To-Link Map- ping elements and not present in the other TID-To-Link Mapping element. |
| <Last assigned + 5> | R-TWT Link Replacement | According to one embodiment, One or more R-TWT Link Replacement elements are optionally present if dot11MultiLinkActivated, dot11RestrictedTWTOptionImplemented, and dot11RTWTLinkReplacementOptionImplemented are true; otherwise, none are present. |

In some embodiments, a first STA affiliated with a non-AP MLD associated with an AP MLD has obtained a membership of a first R-TWT schedule on a first link between the AP MLD and the non-AP MLD. The non-AP MLD may receive an R-TWT Link Replacement element included in a beacon frame or a probe response frame indicating that the first R-TWT schedule on the first link is scheduled to be unavailable and a second R-TWT schedule is established on a second link between the AP MLD and the non-AP MLD as a replacement. Then, the non-AP MLD may transmit a Link Replacement Acknowledgement frame to the AP MLD over any enabled link between the AP MLD and the non-AP MLD. The Link Replacement Acknowledgement frame may include an R-TWT Link Replacement element with the same parameters as the R-TWT Link Replacement element previously received from the AP MLD. Upon successfully transmitting the Link Replacement Acknowledgement frame by the non-AP MLD, the first R-TWT schedule on the first link may be suspended from the firs STA at the time indicated in the Link Replacement Time subfield of the R-TWT Link Replacement element. The second STA affiliated with the non-AP MLD may become a member of the second R-TWT schedule on the second link, starting from the time indicated in the Link Replacement Time subfield of the R-TWT Link Replacement element.

In some embodiments, when the first R-TWT schedule become unavailable due to the unavailability of the first link through advertised TID-to-Link Mapping, upon re-enablement of the link, the first R-TWT schedule is re-established on the first link and the second R-TWT schedule is deleted on the second link, starting from the first R-TWT SP that comes after the re-enablement time of the first link.

Table 3 below shows an example of Protected EHT (extremely high throughput) Action field values. In this example, the Link Replacement Acknowledgement frame has a value of 8 in Table 3. Other values for the Link Replacement Acknowledgement frame are also possible.

TABLE 3

| Value | Meaning | Time priority |
|---|---|---|
| 0 | TID-To-Link Mapping Request | No |
| 1 | TID-To-Link Mapping Response | No |
| 2 | TID-To-Link Mapping Teardown | No |
| 3 | EPCS Priority Access Enable Request | No |
| 4 | EPCS Priority Access Enable Response | No |
| 5 | EPCS Priority Access Teardown | No |
| 6 | EML Operating Mode Notification | No |
| 7 | Link Recommendation | No |
| 8 | Link Replacement Acknowledgement | No |
| 9-255 | | |

Table 4 shows an example of Element ID of the R-TWT Link Replacement element that may be applicable to IEEE 802.11be standard and any future amendments to IEEE 802.11 standard.

TABLE 4

| Element | Element ID | Element ID Extension | Extensible | Fragmentable |
|---|---|---|---|---|
| R-TWT Link Replacement (see 9.4.2.xxx R-TWT Link Replacement element) | 255 | <ANA> | Yes | Yes |

Table 5 below shows an example of the Link Replacement Acknowledgement frame format which may be applicable to IEEE 802.11be standard and any future amendments to IEEE 802.11 standard. The Category field may have a specific value to represent the Protected EHT Action frame. The Protected EHT Action field may have a value to represent the Link Replacement Acknowledgement. For example, the Protected EHT Action field has a value of 8 in Table 3. The Dialog Token field is set to a nonzero value chosen by the STA sending the Link Replacement Acknowledgement frame. The Link Replacement Acknowledgement frame may have the same parameters as the R-TWT Link Replacement element received from the AP MLD.

TABLE 5

| Order | Information |
|---|---|
| 1 | Category |
| 2 | Protected EHT Action |
| 3 | Dialog Token |
| 4 | R-TWT Link Replacement |

In some embodiments, a first set of TIDs (S1) may be mapped on a first link and a second set of TIDs (S2) may be mapped on a second link. A first R-TWT schedule for a first set of R-TWT TIDs (R1) may be established on the first link. Then, the AP MLD may decide to remove the first R-TWT schedule from the first link and, as a replacement, may intend to establish a second R-TWT schedule on the second link. A second set of R-TWT TIDs (R2) may be applicable to the second R-TWT schedule on the second link. The second set of R-TWT TIDs (R2) may the intersection of R1 and S2, represented as $R2=(R1\cap S2)$. In other words, the second set of R-TWT TIDs on the second link may include the common TID values of these two sets (R1 and S2). For example, if S2={TID3, TID 4, TID 7} and R1={TID4, TID5, TID7}, then R2={TID4, TID7}. In some implementations, the second set of R-TWT TIDs (R2) may be the same as the first set of R-TWT TIDs (R1), i.e., R2=R1. It would be applicable if the first set of R-TWT TIDs (R1) is not a subset of the second set of TIDs (S2). In an embodiment, when the first set of R-TWT TIDs (R1) is not a subset of the second set of TIDs (S2), a new second set of TIDs ($S2^{new}$) would be created as the union of the set R1 and S2, represented as $S2^{new}=R1 \cup S2$. In some implementations, upon receiving the R-TWT Link Replacement element from the AP MLD, the STAs affiliated with the non-AP MLD may transmit the Link Replacement Acknowledgement frame which includes information on the TIDs that are mapped on the second link. In an embodiment, the AP MLD may initiate a new TID-to-Link mapping to map all the R-TWT TIDs corresponding to the set R1 on the second link before the second R-TWT schedule is established on the second link.

In some embodiments, the AP MLD may initiate the R-TWT link replacement procedure for various purposes. That is, the R-TWT link replacement may occur for reasons other than link unavailability or link deletion.

In some embodiments, a first R-TWT schedule for a first set of R-TWT TIDs (R1) may be established on a first link. When the AP MLD decides to remove the first R-TWT schedule on the first link and to establish a second R-TWT schedule on the second link as a replacement, any APs affiliated with the AP MLD may include corresponding R-TWT Link Replacement element in a beacon frame or a probe response frame. That is, each AP affiliated with the AP MLD may advertise information related to the link replacement via its corresponding link. For example, the first AP of the AP MLD may include its R-TWT Link Replacement element in a beacon frame or a probe response frame transmitted on the first link, and the second AP of the AP MLD may include its R-TWT Link Replacement element in a beacon frame or a probe response frame transmitted on the second link.

The R-TWT link replacement procedure described above in this disclosure may be generalized to be applicable for any broadcast TWT schedule.

Figure 11:
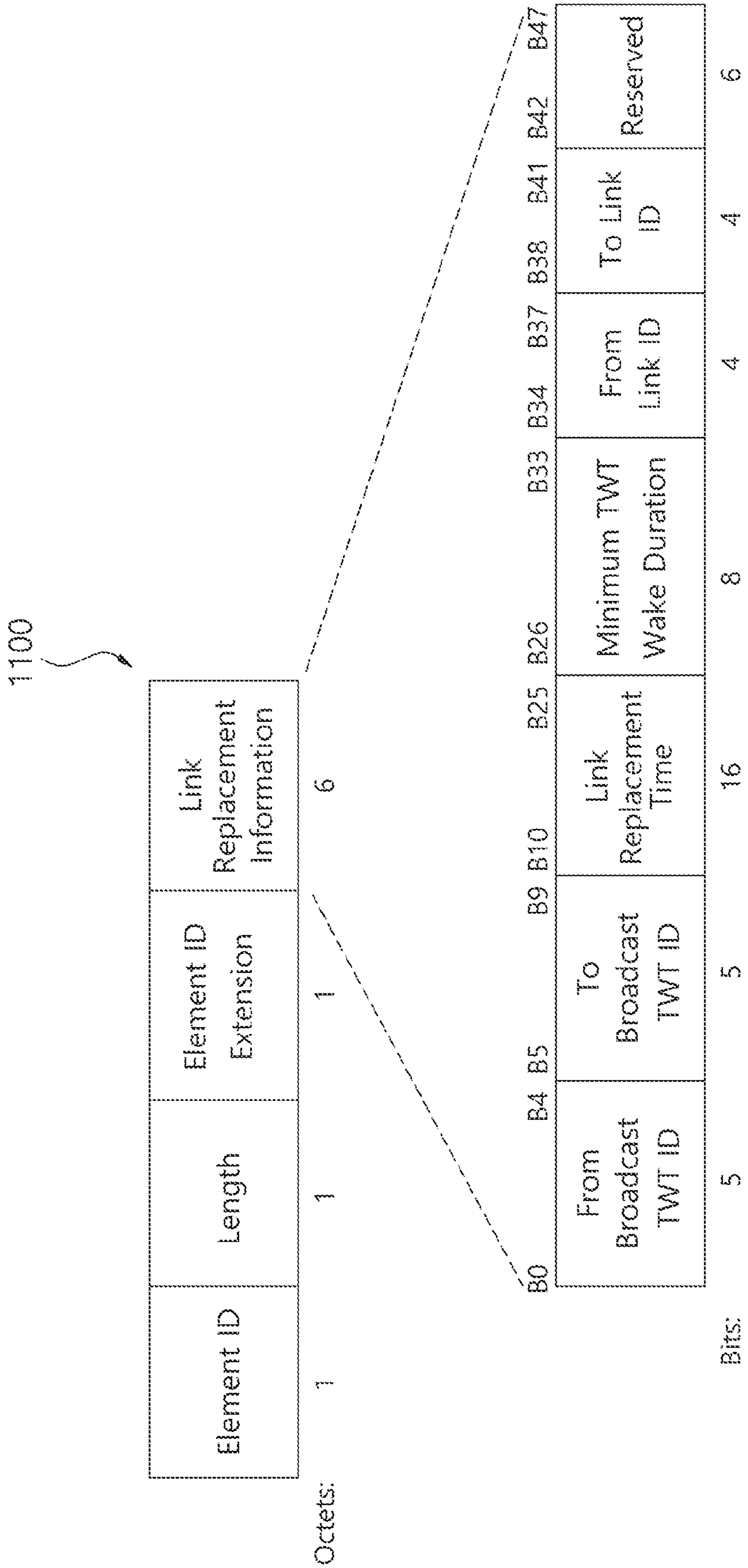
FIG. 11 shows an example of a Broadcast TWT Link Replacement element format in accordance with an embodiment.

FIG. 11 shows an example of a Broadcast TWT Link Replacement element format in accordance with an embodiment. This example may be applicable to IEEE 802.11be standard and any future amendments to IEEE 802.11 standard.

The Broadcast TWT Link Replacement element 1100 may include an Element ID field, a Length field, an Element ID Extension field, and a Link Replacement Information field. The Element ID field and the Element ID Extension field may include information to identify the Broadcast TWT Link Replacement element. The Length field may indicate the length of the Broadcast TWT Link Replacement element. The Link Replacement Information field may include a From Broadcast TWT ID subfield, a To Broadcast TWT ID subfield, a Link Replacement Time subfield, a Minimum TWT Wake Duration subfield, a From Link ID subfield, a To Link ID subfield, and a Reserved subfield.

The From Broadcast TWT ID subfield may indicate the broadcast TWT ID of the Broadcast TWT schedule on the link (e.g., a first link), indicated by the From Link ID subfield, from which the Broadcast TWT schedule is moved to a different link (e.g., a second link) using the Broadcast TWT Link Replacement element.

The To Broadcast TWT ID subfield may indicate the broadcast TWT ID of the Broadcast TWT schedule on the link (e.g., the second link), indicated by the To Link ID subfield, onto which the Broadcast TWT schedule is moved using the Broadcast TWT Link Replacement element.

The Link Replacement Time subfield may include a positive unsigned integer corresponding to a TSF time at which the Broadcast TWT schedule, identified by the From Broadcast TWT ID subfield, is moved from one link (e.g., the first link) onto another link (e.g., the second link) between the AP MLD and the non-AP MLD. The TSF time indicated in the Link Replacement Time subfield may be with respect to the TSF of the link from which the Broadcast TWT schedule is moved.

The Minimum TWT Wake Duration subfield may indicate the minimum amount of time that the TWT scheduled STA is expected to be awake for the period of TWT wake interval corresponding to the replacement Broadcast TWT schedule on the link onto which the Broadcast TWT schedule is moved. The unit of Minimum TWT Wake Duration subfield value of the Broadcast TWT Link Replacement element may be the same as that of the Nominal Minimum TWT Wake Duration subfield of the original Broadcast TWT schedule on the link indicated in the From Link ID subfield of the Link Replacement Information field.

From Link ID subfield may indicate the link (e.g., the first link) of an AP MLD from which the Broadcast TWT schedule is moved to another link (e.g., the second link).

To Link ID subfield may indicate the link (e.g., the second link) of an AP MLD onto which the Broadcast TWT schedule is moved.

Table 6 shows an example of Element ID of the Broadcast TWT Link Replacement element.

TABLE 6

| Element | Element ID | Element ID Extension | Extensible | Fragmentable |
|---|---|---|---|---|
| Broadcast TWT Link Replacement (see 9.4.2.xxx Broadcast TWT Link Replacement element) | 255 | <ANA> | Yes | Yes |

Table 7 shows an example of a beacon frame body which includes the Broadcast TWT Link Replacement element.

TABLE 7

| Order | Information | Notes |
|---|---|---|
| <Last assigned + 1> | Broadcast TWT Link Replacement | One or more Broadcast TWT Link Replacement elements are optionally present if dot11MultiLinkActivated and dot11TWTOptionActivated are true; otherwise, none are present. |

Table 8 shows an example of a probe response frame body which includes the Broadcast TWT Link Replacement element.

TABLE 8

| Order | Information | Notes |
|---|---|---|
| <Last assigned + 1> | Broadcast TWT Link Replacement | One or more Broadcast TWT Link Replacement elements are optionally present if dot11MultiLinkActivated and dot11TWTOptionActivated are true; otherwise, none are present. |

Table 9 below shows an example of the Protected EHT Action field values.

TABLE 9

| Value | Meaning | Time priority |
|---|---|---|
| 0 | TID-To-Link Mapping Request | No |
| 1 | TID-To-Link Mapping Response | No |
| 2 | TID-To-Link Mapping Teardown | No |
| 3 | EPCS Priority Access Enable Request | No |
| 4 | EPCS Priority Access Enable Response | No |
| 5 | EPCS Priority Access Teardown | No |
| 6 | EML Operating Mode Notification | No |
| 7 | Link Recommendation | No |
| 8 | Multi-Link Operation Update Request | No |
| 9 | Multi-Link Operation Update Response | No |
| 10 | Link Replacement Acknowledgement | No |
| 11-255 | Reserved | |

Table 10 shows an example of the Link Replacement Acknowledgement frame format. The Category field may have a specific value to represent the Protected EHT Action frame. The Protected EHT Action field may have a value to represent the Link Replacement Acknowledgement. For example, the Protected EHT Action field has a value of 10 in Table 9. The Dialog Token field is set to a nonzero value chosen by the STA sending the Link Replacement Acknowledgement frame. The Link Replacement Acknowledgement frame may have the same parameters as the Broadcast TWT Link Replacement element received from the AP MLD.

TABLE 10

| Order | Information |
|---|---|
| 1 | Category |
| 2 | Protected EHT Action |
| 3 | Dialog Token |
| 4 | Broadcast TWT Link Replacement (9.4.2.xxx Broadcast TWT Link Replacement element) |

In some embodiments, a first broadcast TWT schedule may be established on a first link between an AP MLD and one or more non-AP MLDs and the first link may be impending to be unavailable. In this case, the AP MLD may announce, by including a Broadcast TWT Link Replacement element in a beacon frame or a probe response frame, that the first broadcast TWT schedule on the first link becomes unavailable and, as a replacement, a second broadcast TWT schedule is available for members on a second broadcast TWT schedule on the second link from the time indicated in the Link Replacement Time subfield of the Broadcast TWT Link Replacement element. The AP MLD may advertise one or more Broadcast TWT Link Replacement element via all or part of enabled links to the associated non-AP MLDs. The second broadcast TWT schedule may be either an existing schedule on the second link or a schedule newly created by the AP affiliated with the AP MLD on the second link.

In some embodiments, a first STA affiliated with a non-AP MLD associated with an AP MLD has obtained a membership of a first broadcast TWT schedule on a first link between the AP MLD and the non-AP MLD. The non-AP MLD may receive a Broadcast TWT Link Replacement element included in a beacon frame or a probe response frame, indicating that the first broadcast TWT schedule on the first link is scheduled to be unavailable and, as a replacement, a second broadcast TWT schedule is available on a second link. Then, the non-AP MLD over any enabled link between the AP MLD and the non-AP MLD may transmit a Link Replacement Acknowledgement frame to the AP MLD. The Link Replacement Acknowledgement frame may include a Broadcast TWT Link Replacement element with the same parameters as the Broadcast TWT Link Replacement element received from the AP MLD. Upon successfully transmitting the Link Replacement Acknowledgement frame by the non-AP MLD, the first broadcast TWT schedule on the first link may be deleted for the first STA affiliated with the non-AP MLD at the time indicated in the Link Replacement Time subfield of the Broadcast TWT Link Replacement element. Then, the second STA affiliated with the non-AP MLD becomes a member of the second broadcast TWT schedule on the second link, starting from the time indicated in the Link Replacement Time subfield. The first link and the second link may be identified by the From Link ID subfield and the To Link ID subfield of the Broadcast TWT Link Replacement element, respectively. The Broadcast TWT ID subfields corresponding to the broadcast TWT schedule on the first link and the second link are identified by the From Broadcast TWT ID subfield and the To Broadcast TWT ID subfield of the Broadcast TWT Link Replacement element, respectively. The minimum wake duration of the second broadcast TWT schedule on the second link may be indicated by the Minimum TWT Wake Duration subfield of the Broadcast TWT Link Replacement element.

In some embodiments, if a first R-TWT schedule established on a first link between an AP MLD and a non-AP MLD is replaced by a second R-TWT schedule available on a second link between the AP MLD and the non-AP MLD using the Broadcast TWT Link Replacement element, then the R-TWT TID(s) for uplink and downlink corresponding to the second R-TWT schedule on the second link may be derived by taking the intersection of two sets, set-1 and set-2. Where the set-1 denotes the R-TWT TID(s) corresponding to the first R-TWT schedule on the first link and the set-2 denotes the TID(s) that are mapped on the second link using TID-to-Link mapping for uplink and downlink, respectively. Other parameters of the second R-TWT schedule on the second link may remain the same as the TWT parameters of the first R-TWT schedule on the first link.

Figure 12:
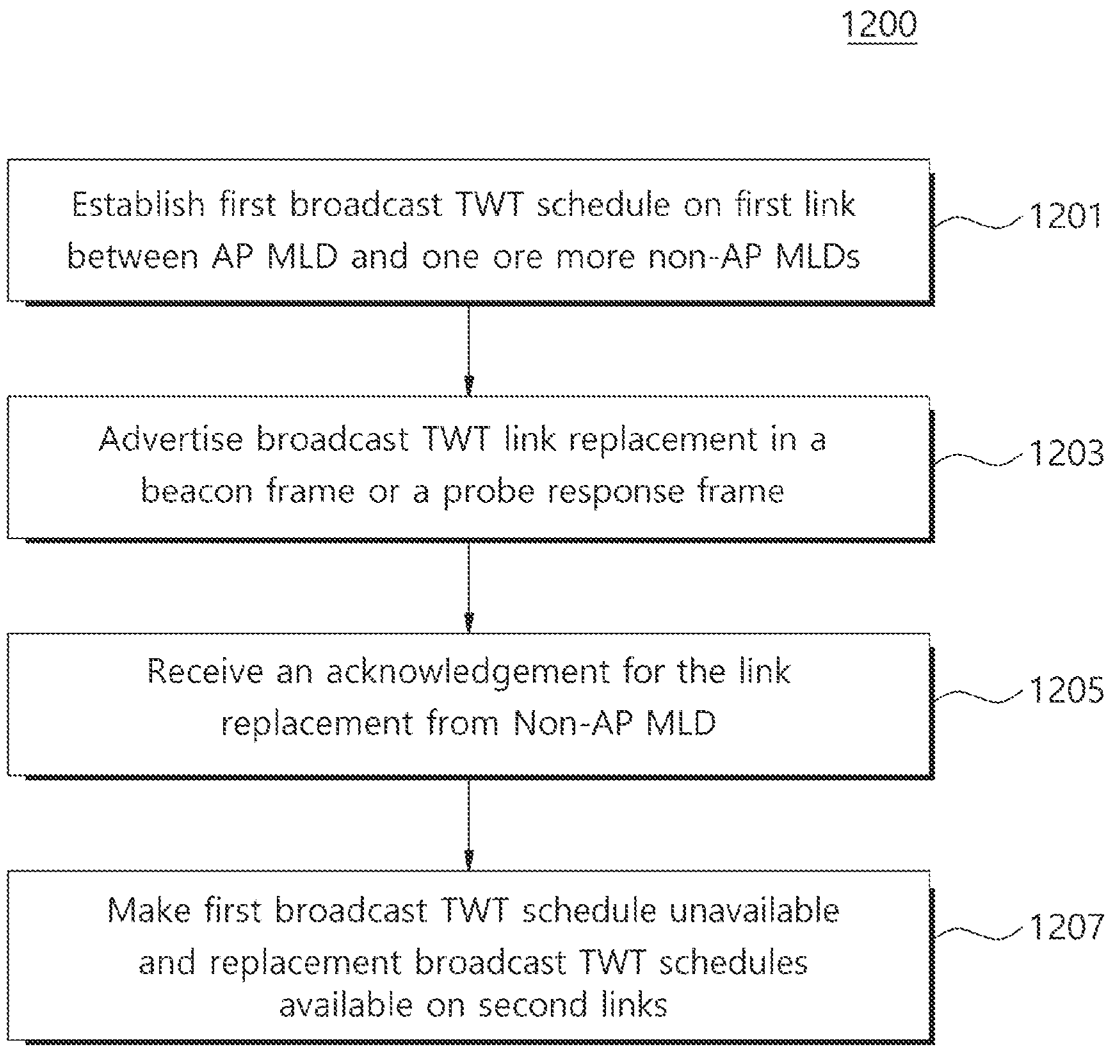
FIG. 12 shows an example of a link replacement process performed by an AP MLD in accordance with an embodiment.

FIG. 12 show an example of a link replacement process 1200 performed by an AP MLD in accordance with an embodiment.

In operation 1201, a first AP affiliated with an AP MLD establishes a first broadcast TWT schedule on a first link with a first STA affiliated with one or more non-AP MLDs. When the first link is scheduled or impending to be unavailable for certain reasons, the process 1200 proceed to operation 1203.

In operation 1203, when the first link is scheduled or impending to be unavailable, the AP MLD may advertise broadcast TWT link replacement to associated non-AP MLDs in its BSS by announcing that the first broadcast TWT schedule on the first link becomes unavailable and a replacement broadcast TWT schedule is available on an alternative link. The necessary information for the broadcast TWT link replacement may be included in the Broadcast TWT Link Replacement element in a beacon frame or a probe response frame. The Broadcast TWT Link Replacement element includes the time at which the first broadcast TWT schedule is unavailable and the replacement broadcast TWT schedule becomes available. The AP MLD may advertise the broadcast TWT link replacement over all or part of enabled links with the associated non-AP MLDs.

In operation 1205, the AP MLD receives an acknowledgement frame from one or more non-AP MLDs. The acknowledgement frame may be a Link Replacement Acknowledgement frame. The Link Replacement Acknowledgement frame may include a Broadcast TWT Link Replacement element with the same parameters as the Broadcast TWT Link Replacement element that is transmitted by the AP MLD. Then, the process 1200 proceeds to operation 1207.

In operation 1207, the AP MLD makes the first broadcast TWT schedule on the first link unavailable from the time indicated by the Broadcast TWT Link Replacement element. Meanwhile, the AP MLD makes one or more replacement broadcast TWT schedules on one or more alternative links available from the time indicated by the Broadcast TWT Link Replacement element. Accordingly, one or more second STAs of associated non-AP MLDs become a member of one or more replacement broadcast TWT schedules on the one or more alternative links.

Figure 13:
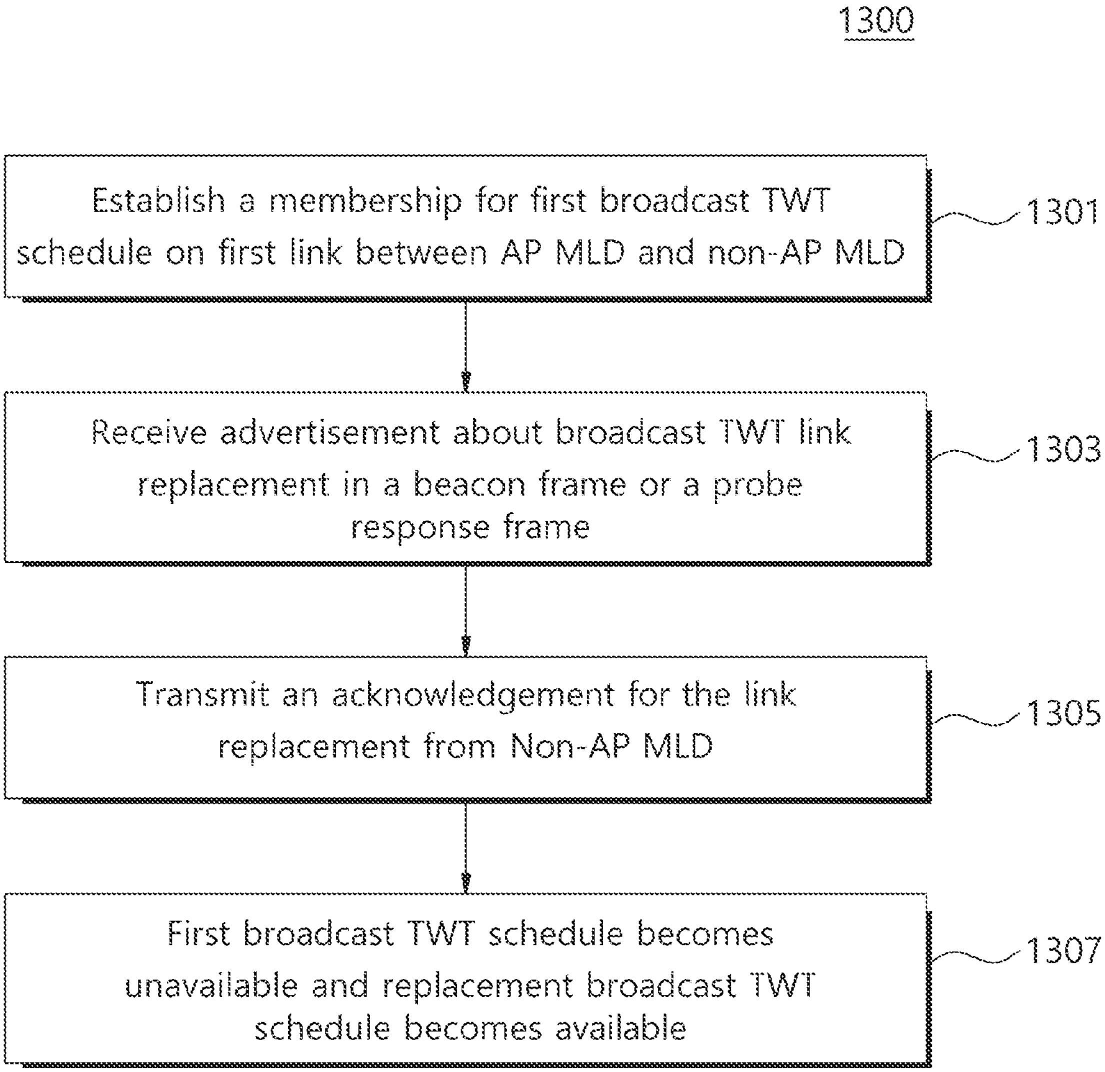
FIG. 13 shows an example of a link replacement process performed by a non-AP MLD in accordance with an embodiment.

FIG. 13 show an example of a link replacement process 1300 performed by a non-AP MLD in accordance with an embodiment.

In operation 1301, a first STA affiliated with the non-AP MLD establishes a membership of a first broadcast TWT schedule on a first link with a first AP affiliated with associated AP MLD. Accordingly, the first broadcast TWT schedule is established on the first link.

In operation 1303, the non-AP MLD receives an advertisement about broadcast TWT link replacement in a beacon frame or a probe response frame transmitted from the AP MLD. The advertisement announces that the first broadcast TWT schedule on the first link becomes unavailable and a replacement broadcast TWT schedule become available on an alternative link. The necessary information for the broadcast TWT link replacement may be included in the Broadcast TWT Link Replacement element in a beacon frame or a probe response frame. The Broadcast TWT Link Replacement element includes the time at which the first broadcast TWT schedule becomes unavailable and the replacement broadcast TWT schedule becomes available. The Broadcast TWT Link Replacement element may be received by all or part of enabled links between the non-AP MLD and the associated AP MLD. Then, the process 1300 proceeds to operation 1305.

In operation 1305, in response to receiving the advertisement, the non-AP MLD transmits an acknowledgement frame to the AP MLD via any enabled link between the non-AP MLD and the AP MLD. The acknowledgement frame may be a Link Replacement Acknowledgement frame. The Link Replacement Acknowledgement frame may include a Broadcast TWT Link Replacement element with the same parameters as the Broadcast TWT Link Replacement element that is transmitted by the AP MLD. Then, the process 1300 proceeds to operation 1307.

In operation 1307, when the non-AP MLD successfully transmits the acknowledgement to the AP MLD, the first broadcast TWT schedule on the first link is deleted and the second STA affiliated with the non-AP MLD becomes a member of the replacement broadcast TWT schedule on the alternative link, starting from the time indicated by the Broadcast TWT Link Replacement element.

In some embodiments, multiple TWT schedules may be established over multiple links between an AP MLD and a non-AP MLD, and the multiple TWT SPs over multiple links may overlap or align with each other. In these cases, a first AP affiliated with the AP MLD may perform a part of PPDU transmission to a first STA affiliated with the non-AP MLD during the TWT SP on the first link, and then may end PPDU transmission on the first link. Subsequently, a second AP affiliated with the same AP MLD may perform the remainder of PPDU transmission on the second link during the overlapping TWT SP established on the second link. Therefore, a portion of the PPDU transmission takes place on the first link, and the rest of the PPDU transmission takes place on the second link. That is, the TWT link switch from the first link to the second link may take place while transmitting PPDUs during the TWT SP over two links. The TWT link switch may be useful for devices that operate on EMLSR (enhanced multi-link single radio), EMLMR (enhanced multi-link multi-radio), or NSTR (non-simultaneous transmit and receive) operation mode.

Similarly, when multiple TWT schedules are be established over multiple links between an AP MLD and a non-AP MLD and the multiple TWT SPs over multiple links overlap or align with each other, a first STA affiliated with the non-AP MLD may perform a part of PPDU transmission to a first AP affiliated with the AP MLD during the TWT SP on the first link, and then may end PPDU transmission on the first link. Subsequently, a scone STA affiliated with the same non-AP MLD may perform the remainder of PPDU transmission on the second link during the overlapping TWT SP established on the second link. Therefore, a portion of the PPDU transmission takes place over the first link, and the rest of the PPDU transmission takes place over the second link. That is, the TWT link switch from the first link to the second link may take place while transmitting PPDUs during the TWT SP over two links. The TWT link switch may be useful for devices that operate on EMLSR, EMLMR, or NSTR operation mode.

In some embodiments, before switching the link from the first link to the second link during the TWT SP, either the AP or the STA may transmit a framing including a link switch indicator (LSI) on the first link where frame exchange is taking place. The LSI may indicate switching the link for transmitting the remainder of the PPDUs over other TWT SP on second link, which overlaps with the TWT SP on the first link.

Figure 14A:
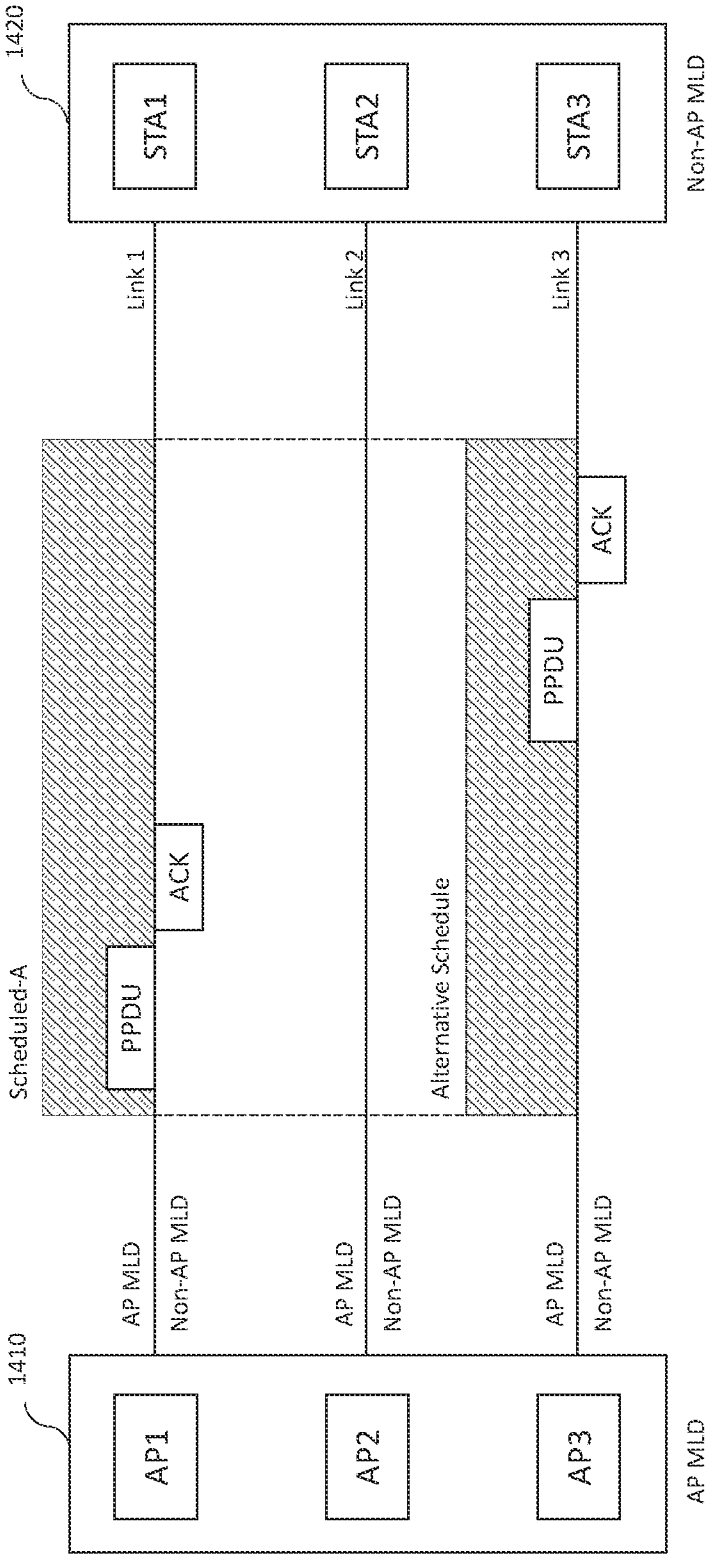
FIGS. 14A and 14B show examples of wireless communication in accordance with an embodiment.
Figure 14B:
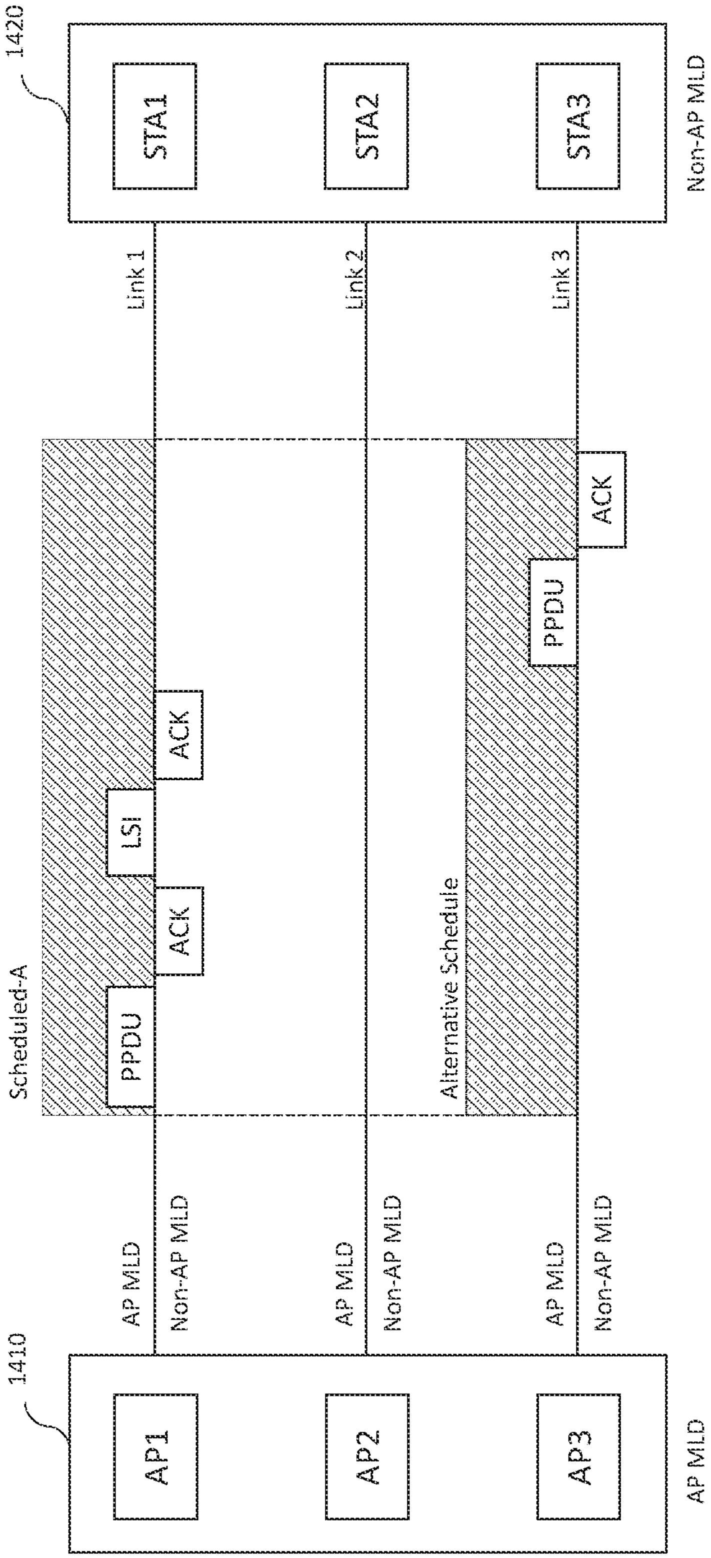

FIGS. 14A and 14B show examples of wireless communication in accordance with an embodiment. These examples may be applicable to IEEE 802.11be standard and any future amendments to IEEE 802.11 standard. The AP MLD 1410 and the non-AP MLD 1420 may be examples of the AP MLD 310 and the non-AP MLD 320 illustrated in FIG. 3, respectively. The AP MLD 1410 may include three affiliated APs (AP 1, AP 2, and AP 3), and the non-AP MLD 1420 may include three affiliated STAs (STA 1, STA 2, and STA 3). AP 1 and STA 1 may operate on Link 1 (a first link), AP 2 and STA 2 may operate on Link 2 (a second link), and AP 3 and STA 3 may operate on Link 3 (a third link). Link 1, Link 2, and Link 3 may use the 2.4 GHz frequency band, the 5 GHz frequency band, and the 6 GHz frequency band, respectively.

FIG. 14A shows an example of the TWT link switch during the TWT SP in accordance with an embodiment. Two TWT schedules may be established on Link 1 and Link 3, and two TWT SPs established on Link 1 and Link 3 may overlap or align with each other. In this example, the AP 1 of the AP MLD 1410 performs frame exchanges in the TWT SP (Schedule-A) on Link 1. For example, the AP 1 transmits a PPDU to the STA 1 of the non-AP MLD 1420 and receives an ACK frame from the STA 1. Then, the AP 1 ends PPDU transmission in the middle of the TWT SP on Link 1. After that, the AP 3 resumes the PPDU transmission on Link 3 within the TWT SP on Link 3. More specifically, the AP 3 transmits the remaining PPDU to STA 3 and receives an ACK frame from the STA 3. In FIG. 3, the TWT schedule on Link 3 may be an alternative TWT schedule of the TWT schedule (Schedule-A) on Link 1.

FIG. 14B shows another example of the TWT link switch during the TWT SP in accordance with an embodiment. In FIG. 14B, the AP 1 of the AP MLD 1410 may transmit a frame including a link switch indicator (LSI) before switching the link from Link 1 to Link 3 during the TWT SP. More specifically, the AP 1 of the AP MLD 1410 transmits a PPDU to the STA 1 of the non-AP MLD 1420 and receives an ACK frame from the STA 1. Then, the AP 1 transmits the link switch indicator (LSI) to the STA 1, indicating the TWT link switching from Link 1 to Link 3 over the TWT SP. Then, the AP 3 of the AP MLD 1410 transmits the remaining PPDU to STA 3 and receives an ACK frame form the STA 3.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP) multi-link device (MLD) associated with a non-AP MLD in a wireless network, the AP MLD comprising:
- at least two APs affiliated with the AP MLD; and
- a processor coupled to the at least two APs, the processor configured to:
  - establish a first broadcast Target Wake Time (TWT) schedule on a first link between a first AP affiliated with the AP MLD and a first station (STA) affiliated with the non-AP MLD;
  - transmit TWT link replacement information to the non-AP MLD via at least one link between the AP MLD and the non-AP MLD, the TWT link replacement information (i) indicating that the first broadcast TWT schedule on the first link is replaced by a second broadcast TWT schedule on a second link between a second AP affiliated with the AP MLD and a second STA affiliated with the non-AP MLD and (ii) including a replacement time field indicating a time for link replacement;
  - receive a link replacement acknowledgement from the non-AP MLD via a link between the AP MLD and the non-AP MLD; and
  - move the first broadcast TWT schedule on the first link to the second broadcast TWT schedule on the second link at the time indicated in the replacement time field.

2. The AP MLD of claim 1, wherein the TWT link replacement information is transmitted on the first link.

3. The AP MLD of claim 1, wherein the first broadcast TWT schedule on the first link becomes unavailable and the second broadcast TWT schedule on the second link becomes available at the time indicated in the TWT link replacement information.

4. The AP MLD of claim 1, wherein the TWT link replacement information is included in a beacon frame or a probe response frame.

5. The AP MLD of claim 1, wherein the link replacement acknowledgement includes information that is same as the TWT link replacement information transmitted by the AP MLD.

6. The AP MLD of claim 1, wherein the TWT link replacement information includes an identifier of the first broadcast TWT schedule and an identifier of the second broadcast TWT schedule.

7. The AP MLD of claim 1, wherein the TWT link replacement information includes a minimum amount of time for which the second STA is expected to be awake for a period of TWT wake interval on the second link.

8. The AP MLD of claim 1, wherein the TWT link replacement information includes an identifier of the first link and an identifier of the second link.

9. The AP MLD of claim 1, wherein:
- the first broadcast TWT schedule is a first restricted TWT (R-TWT) schedule and the second broadcast TWT schedule is a second R-TWT schedule,
- one or more R-TWT traffic identifiers (TIDs) for the second R-TWT schedule on the second link are derived using intersection of a first set of TIDs and a second set of TIDs, and
- the first set of TIDs is one or more R-TWT TIDs of the first R-TWT schedule and the second set of TIDs is one or more TIDs that are mapped on the second link using TID-to-link mapping.

10. The AP MLD of claim 9, wherein TWT parameters of the second R-TWT schedule that are not included in the TWT link replacement information are same as TWT parameters of the first R-TWT schedule.

11. A non-access point (AP) multi-link device (MLD) associated with an AP MLD in a wireless network, the non-AP MLD comprising:
- at least two stations (STAs) affiliated with the non-AP MLD; and
- a processor coupled to the at least two STAs, the processor configured to:
  - establish a membership of a first broadcast Target Wake Time (TWT) schedule on a first link between a first STA affiliated with the non-AP MLD and a first AP affiliated with the AP MLD;
  - receive TWT link replacement information from the AP MLD via at least one link between the non-AP MLD and the AP MLD, the TWT link replacement information (i) indicating that the first broadcast TWT schedule on the first link is replaced by a second broadcast TWT schedule on a second link between a second STA affiliated with the non-AP MLD and a second AP affiliated with the AP MLD and (ii) including a replacement time field indicating a time for link replacement; and
  - in response to receiving the TWT link replacement information, transmit a link replacement acknowledgement to the AP MLD via a link between the non-AP MLD and the AP MLD, wherein the first broadcast TWT schedule on the first link is moved to the second broadcast TWT schedule on the second link at the time indicated in the link replacement time field.

12. The non-AP MLD of claim 11, wherein the TWT link replacement information is transmitted on the first link.

13. The non-AP MLD of claim 11, wherein the first broadcast TWT schedule on the first link becomes unavailable and the second broadcast TWT schedule on the second link becomes available at the time indicated in the TWT link replacement information.

14. The non-AP MLD of claim 11, wherein the TWT link replacement information is included in a beacon frame or a probe response frame.

15. The non-AP MLD of claim 11, wherein the link replacement acknowledgement includes information that is same as the TWT link replacement information received from the AP MLD.

16. The non-AP MLD of claim 11, wherein the TWT link replacement information includes an identifier of the first broadcast TWT schedule and an identifier of the second broadcast TWT schedule.

17. The non-AP MLD of claim 11, wherein the TWT link replacement information includes a minimum amount of time for which the second STA is expected to be awake for a period of TWT wake interval on the second link.

18. The non-AP MLD of claim 11, wherein the TWT link replacement information includes an identifier of the first link and an identifier of the second link.

19. The non-AP MLD of claim 11, wherein:

the first broadcast TWT schedule is a first restricted TWT (R-TWT) schedule and the second broadcast TWT schedule is a second R-TWT schedule, one or more R-TWT traffic identifiers (TIDs) for the second R-TWT schedule on the second link are derived using intersection of a first set of TIDs and a second set of TIDs, and the first set of TIDs is one or more R-TWT TIDs of the first R-TWT schedule and the second set of TIDs is one or more TIDs that are mapped on the second link using TID-to-link mapping.

20. The non-AP MLD of claim 19, wherein TWT parameters of the second R-TWT schedule that are not included in the TWT link replacement information are same as TWT parameters of the first R-TWT schedule.

* * * * *